(12) United States Patent
Kim et al.

(10) Patent No.: US 12,321,427 B2
(45) Date of Patent: *Jun. 3, 2025

(54) ELECTRONIC DEVICE AND CONTROLLING METHOD FOR INSTALLING NEURAL NETWORK MODELS SUITABLE FOR HARDWARE OF THE ELECTRONIC DEVICE

(71) Applicant: Samsung Electronics Co., Ltd., Suwon-si (KR)

(72) Inventors: Jaehong Kim, Suwon-si (KR); Juyong Song, Suwon-si (KR); Hyunjoo Jung, Suwon-si (KR); Jungwook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,006

(22) Filed: Feb. 20, 2024

(65) Prior Publication Data

US 2024/0193238 A1    Jun. 13, 2024

Related U.S. Application Data

(63) Continuation of application No. 17/113,615, filed on Dec. 7, 2020, now Pat. No. 11,914,688.

(Continued)

(30) Foreign Application Priority Data

Sep. 29, 2020    (KR) .................. 10-2020-0127461

(51) Int. Cl.
*G06N 3/045*    (2023.01)
*G06F 8/61*    (2018.01)
(Continued)

(52) U.S. Cl.
CPC ............... *G06F 21/31* (2013.01); *G06F 8/61* (2013.01); *G06F 18/285* (2023.01); *G06N 3/045* (2023.01); *G06V 10/764* (2022.01); *G06V 10/82* (2022.01)

(58) Field of Classification Search
CPC .......... G06F 21/31; G06F 8/61; G06F 18/285; G06N 3/045; G06N 3/063; G06N 3/10; G06V 10/764; G06V 10/82
See application file for complete search history.

(56) References Cited

U.S. PATENT DOCUMENTS 8,392,764 B2    3/2013    De Buen
8,868,689 B1    10/2014   Khanna et al.
(Continued)

FOREIGN PATENT DOCUMENTS

CA    2632509 A1    11/2009
CN    102064958 A    5/2011
(Continued)

OTHER PUBLICATIONS

International Search Report dated Mar. 15, 2021, issued in International Patent Application No. PCT/KR2020/017655.
(Continued)

*Primary Examiner* — Juan M Guillermety
(74) *Attorney, Agent, or Firm* — Jefferson IP Law, LLP

(57) ABSTRACT

An electronic device and a controlling method of an electronic device are provided. The electronic device includes identifying whether each of one or more neural network models included in a first external device is suitable for hardware of the electronic device and whether each of the one or more neural network models identified as suitable for the hardware of the electronic device is suitable to replace the neural network models included in the electronic device, based on first device information on a hardware specifica- (Continued)

tions of the electronic device, second device information on a hardware specification of the first external device, first model information on the one or more neural network models included in the first external device, and second model information on the one or more neural network models included in the electronic device.

20 Claims, 19 Drawing Sheets

Related U.S. Application Data

(60) Provisional application No. 62/945,349, filed on Dec. 9, 2019.

(51) Int. Cl.
*G06F 18/20* (2023.01)
*G06F 21/31* (2013.01)
*G06V 10/764* (2022.01)
*G06V 10/82* (2022.01)

(56) References Cited

U.S. PATENT DOCUMENTS

| 8,868,692 | B1 | 10/2014 | Khanna et al. |
| 9,348,571 | B2 | 5/2016 | Baloch et al. |
| 9,715,660 | B2 | 7/2017 | Parada San Martin et al. |
| 11,914,688 | B2 * | 2/2024 | Kim .................. G06N 3/10 |
| 2011/0119556 | A1 | 5/2011 | De Buen |
| 2015/0242760 | A1 | 8/2015 | Miao et al. |
| 2016/0224892 | A1 | 8/2016 | Sawada et al. |
| 2016/0378462 | A1 | 12/2016 | Hu |
| 2018/0144265 | A1 | 5/2018 | Bonawitz et al. |
| 2020/0014761 | A1 | 1/2020 | Kawaai et al. |
| 2020/0104720 | A1 | 4/2020 | Bao et al. |
| 2020/0151611 | A1 | 5/2020 | McGavran et al. |
| 2020/0202171 | A1 | 6/2020 | Hughes et al. |
| 2020/0401891 | A1 * | 12/2020 | Xu .................. G06N 3/105 |
| 2021/0042621 | A1 | 2/2021 | Zhao |
| 2021/0174187 | A1 | 6/2021 | Han et al. |

FOREIGN PATENT DOCUMENTS

| CN | 107291457 A | 10/2017 |
| CN | 109313673 A | 2/2019 |
| EP | 3 447 645 A1 | 2/2019 |
| JP | 6516531 B2 | 5/2019 |
| JP | 6543066 B2 | 7/2019 |
| KR | 10-2019-0095193 A | 8/2019 |
| WO | 2018/173121 A1 | 9/2018 |
| WO | 2019/103999 A1 | 5/2019 |

OTHER PUBLICATIONS

Extended European Search Report dated Aug. 18, 2022, issued in European Patent Application No. 20898630.7.
European Examination Report dated Oct. 18, 2023, issued in European Patent Application No. 20898630.7.
Extended European Search Report dated Oct. 30, 2024, issued in European Application No. 24192255.8-1203.
Office Action issuance dated Mar. 26, 2025, issued in a Chinese Patent Application No. 202080084829.8.

* cited by examiner

ELECTRONIC DEVICE AND CONTROLLING METHOD FOR INSTALLING NEURAL NETWORK MODELS SUITABLE FOR HARDWARE OF THE ELECTRONIC DEVICE

CROSS-REFERENCE TO RELATED APPLICATION(S)

This application is a continuation application of prior application Ser. No. 17/113,615, filed on Dec. 7, 2020, which claimed priority under 35 U.S.C. § 119(e) of a U.S. Provisional application Ser. No. 62/945,349, filed on Dec. 9, 2019, in the U.S. Patent and Trademark Office, and under 35 U.S.C. § 119(a) of a Korean patent application number 10-2020-0127461, filed on Sep. 29, 2020, in the Korean Intellectual Property Office, the disclosure of which is incorporated by reference herein in its entirety.

BACKGROUND

1. Field

The disclosure relates to an electronic device and a controlling method of the electronic device. More particularly, the disclosure relates to an electronic device and a controlling method of the electronic device for identifying transition suitability of a neural network model included in an external device.

2. Description of Related Art

In recent years, demands from users and industries are increasing for a technology that provides customized services for each user through a personalized neural network model. However, on the other hand, the demand for protection of personal data related to a privacy of users is also increasing, and thus, there are many cases in which it is limited to train a neural network model by collecting personal data necessary for personalization of the neural network model.

Therefore, researches on a technology that enables a neural network model to be used on-device without transmitting the personal data to an external server or cloud, and a technology for transferring information on a personalized neural network model from a specific device to another device through device-to-device communication are drawing attention.

In the case of transferring the information on the personalized neural network model from the specific device to another device, if the types of devices are different from each other or the hardware specifications are different even though the types of devices are the same, it may not be suitable to transfer the neural network model. Therefore, in transferring the information on the personalized neural network model from the device to another device, it is necessary to perform an identification process as to whether it is suitable to transfer the neural network model between different devices.

In addition, when a user of an electronic device purchases a new electronic device, there is a need for a technology capable of transferring the personalized neural network model from an existing electronic device to the new electronic device in an efficient and reliable method.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a controlling method of the electronic device capable of identifying whether it is suitable to transfer a neural network model included in an external device to the electronic device, based on information on a hardware specification and information on a neural network model of each of the electronic device and the external device.

Additional aspects will be set forth in part in the description which follows and, in part, will be apparent from the description, or may be learned by practice of the presented embodiments.

In accordance with an aspect of the disclosure, an electronic device for identifying transition suitability of neural network models included in an external device is provided. The electronic device includes a communicator, a memory configured to store first device information on a hardware specification of the electronic device and a hardware suitability identifier that identifies a neural network model suitable for hardware of the electronic device, and a processor configured to control the communicator to transmit a first signal for requesting information related to one or more neural network models included one or more external devices, based on a user input being received, receive a second signal including second device information on a hardware specification of a first external device and first model information on one or more neural network models included in the first external device from the first external device among the one or more external devices through the communicator, as a response to the first signal, identify whether each of the one or more neural network models included in the first external device is suitable for the hardware of the electronic device by inputting the first device information, the second device information, and the first model information into a hardware suitability identifier, control the communicator to transmit a third signal including a request for installation data of one or more neural network models identified as suitable for the hardware of the electronic device to the first external device, and receive a fourth signal including the installation data of the one or more neural network models identified as suitable for the hardware of the electronic device from the first external device through the communicator, as a response to the third signal, wherein the processor is configured to identify the one or more neural network models included in the first external device as suitable for the hardware of the electronic device, based on a specification of each of the plurality of hardware configurations included in the electronic device being greater than or equal to specifications of a plurality of hardware configurations included in the first external device, and identify one or more neural network models having a hardware requirement specification lower than the specifications of the plurality of hardware configurations included in the electronic device among the one or more neural network models included in the first external device as suitable for the hardware of the electronic device, based on specifications of one or more of the plurality of hardware configurations included in the electronic device being less than the specifications of the plurality of hardware configurations included in the first external device.

In accordance with another aspect of the disclosure, a controlling method of an electronic device that stores first device information on a hardware specification of the electronic device and a hardware suitability identifier that identifies a neural network model suitable for hardware of the electronic device, and identifies transition suitability of neural network models included in an external device is provided. The controlling method includes transmitting a first signal for requesting information related to one or more neural network models included one or more external devices, based on a user input being received, receiving a second signal including second device information on a hardware specification of a first external device and first model information on one or more neural network models included in the first external device from the first external device among the one or more external devices, as a response to the first signal, identifying whether each of the one or more neural network models included in the first external device is suitable for the hardware of the electronic device by inputting the first device information, the second device information, and the first model information into a hardware suitability identifier, transmitting a third signal including a request for installation data of one or more neural network models identified as suitable for the hardware of the electronic device to the first external device, and receiving a fourth signal including the installation data of the one or more neural network models identified as suitable for the hardware of the electronic device from the first external device, as a response to the third signal, wherein the identifying whether each of the one or more neural network models is suitable for the hardware of the electronic device includes, identifying the one or more neural network models included in the first external device as suitable for the hardware of the electronic device, based on a specification of each of the plurality of hardware configurations included in the electronic device being greater than or equal to specifications of a plurality of hardware configurations included in the first external device, and identifying one or more neural network models having a hardware requirement specification lower than the specifications of the plurality of hardware configurations included in the electronic device among the one or more neural network models included in the first external device as suitable for the hardware of the electronic device, based on specifications of one or more of the plurality of hardware configurations included in the electronic device being less than the specifications of the plurality of hardware configurations included in the first external device.

In accordance with another aspect of the disclosure, a non-transitory computer readable recording medium including a program for executing a controlling method of an electronic device that stores first device information on a hardware specification of the electronic device and a hardware suitability identifier that identifies a neural network model suitable for hardware of the electronic device, and identifies transition suitability of neural network models included in an external device is provided. The controlling method includes transmitting a first signal for requesting information related to one or more neural network models included one or more external devices, based on a user input being received, receiving a second signal including second device information on a hardware specification of a first external device and first model information on one or more neural network models included in the first external device from the first external device among the one or more external devices, as a response to the first signal, identifying whether each of the one or more neural network models included in the first external device is suitable for the hardware of the electronic device by inputting the first device information, the second device information, and the first model information into a hardware suitability identifier, transmitting a third signal including a request for installation data of one or more neural network models identified as suitable for the hardware of the electronic device to the first external device, and receiving a fourth signal including the installation data of the one or more neural network models identified as suitable for the hardware of the electronic device from the first external device, as a response to the third signal, wherein the identifying whether each of the one or more neural network models is suitable for the hardware of the electronic device includes identifying the one or more neural network models included in the first external device as suitable for the hardware of the electronic device, based on a specification of each of the plurality of hardware configurations included in the electronic device being greater than or equal to specifications of a plurality of hardware configurations included in the first external device, and identifying one or more neural network models having a hardware requirement specification lower than the specifications of the plurality of hardware configurations included in the electronic device among the one or more neural network models included in the first external device as suitable for the hardware of the electronic device, based on specifications of one or more of the plurality of hardware configurations included in the electronic device being less than the specifications of the plurality of hardware configurations included in the first external device.

In accordance with another aspect of the disclosure, an electronic device for identifying transition suitability of a neural network model included in an external device is provided. The electronic device includes a communicator, a memory configured to store internal model information on one or more neural network models included in the electronic device and a model suitability identifier that identifies neural network models suitable for replacing the neural network models included in the electronic device, and a processor configured to control the communicator to transmit a first signal for requesting information related to one or more neural network models included in one or more external devices, based on a user input being received, receive a second signal including external model information on one or more neural network models included in a first external device from the first external device among the one or more external devices through the communicator, as a response to the first signal, identify whether each of the one or more neural network models included in the first external device is suitable for replacing the neural network models included in the electronic device by inputting the internal model information and the external model information into the model suitability identifier, control the communicator to transmit a third signal including a request for installation data of the one or more neural network models identified as suitable for replacing the neural network models included in the electronic device to the first external device, and receive a fourth signal including the installation data of the one or more identified neural network models from the first external device through the communicator, as a response to the third signal, wherein the processor is configured to compare service types of the one or more neural network models included in the electronic device with service types of the one or more neural network models included in the first external device, based on information on the service type included in each of the internal model information and the external model information, compare a personalization level of a first neural network model and a personalization level of a second neural network model based on the information on the personalization level included in each of the internal model information and the external model information, based on the service type of the first neural network model among the one or more neural network models included in the first external device being the same as the service type of the second neural network model among the plurality of neural network models included in the electronic device, and identify the first neural network model as suitable for replacing the second neural network model, based on the personalization level of the first neural network model being higher than the personalization level of the second neural network model.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
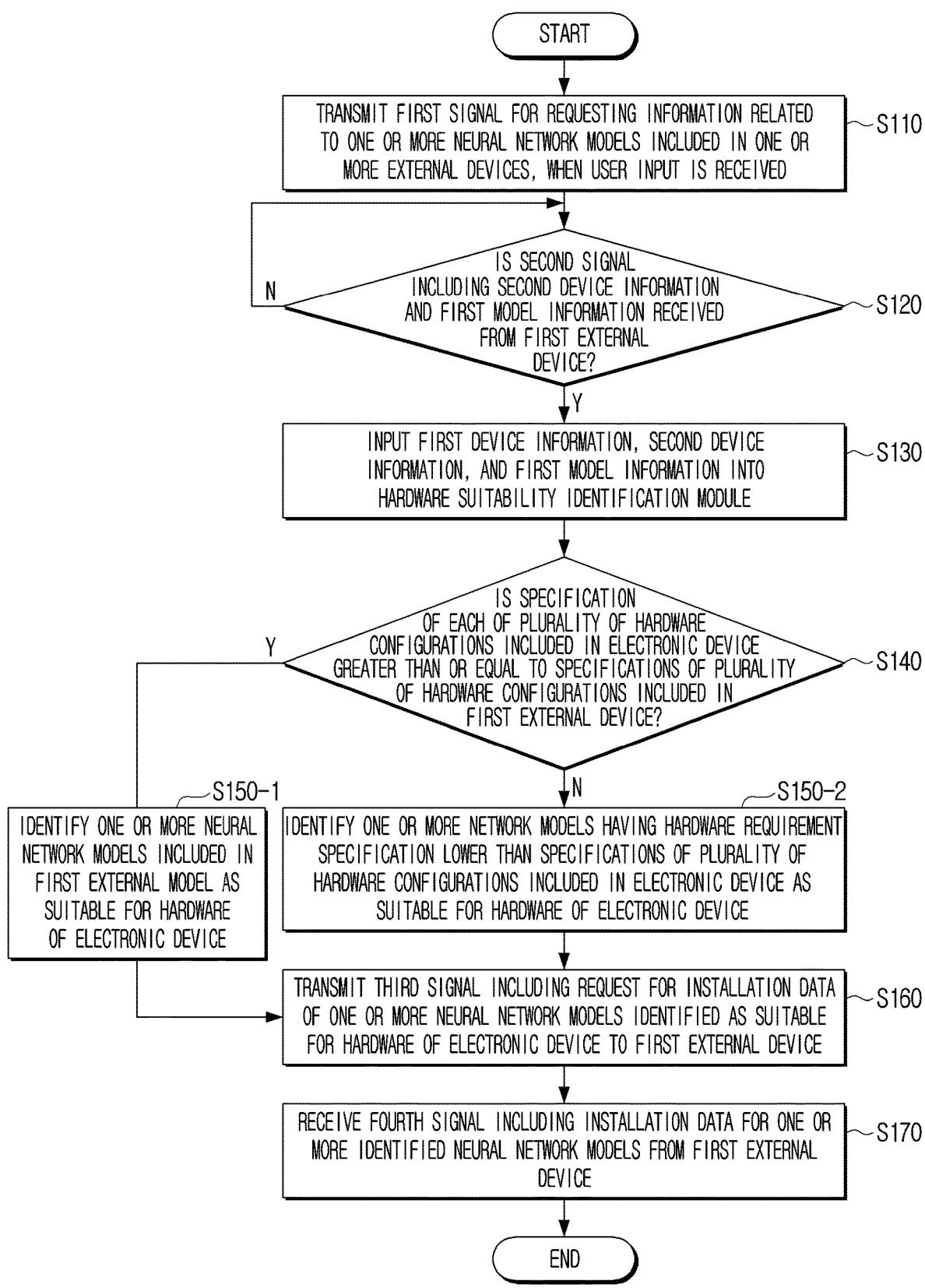
FIG. 1 is a flowchart illustrating a controlling method of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used in the disclosure are used only to describe specific embodiments and are not intended to be limiting of the scope. Singular expressions include plural expressions unless the context clearly indicates otherwise.

In the disclosure, an expression "have", "may have", "include", "may include", and the like, indicates an existence of a corresponding feature (e.g., a numerical value, a function, an operation, a component such as a part, and the like), and does not exclude an existence of an additional feature.

In the disclosure, an expression "A or B", "at least one of A and/or B", "one or more of A and/or B", and the like, may include all possible combinations of items listed together. For example, "A or B", "at least one of A and B", or "at least one of A or B" may refer to all cases (1) including at least one A, (2) including at least one B, or (3) including both at least one A and at least one B.

Expressions "first", "second", and the like, used in the disclosure may indicate various components regardless of a sequence and/or importance of the components, will be used only in order to distinguish one component from the other components, and do not limit the corresponding components.

When it is mentioned that any component (e.g., a first component) is (operatively or communicatively) coupled with/to or is connected to another component (e.g., a second component), it is to be understood that any component is directly coupled with/to another component or may be coupled with/to another component through the other component (e.g., a third component).

On the other hand, when it is mentioned that any component (e.g., a first component) is "directly coupled with/to" or "directly connected to" to another component (e.g., a second component), it is to be understood that the other component (e.g., a third component) is not present between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware.

Instead, in any context, an expression "a device configured to" may mean that the device is "capable of" together with other devices or components. For example, a "processor configured (or set) to perform A, B, and C" may mean a dedicated processor (e.g., an embedded processor) for performing the corresponding operations or a generic-purpose processor (e.g., a central processing unit (CPU) or an application processor) that may perform the corresponding operations by executing one or more software programs stored in a memory device.

In the embodiments, a 'module' or a '~er/or' may perform at least one function or operation, and be implemented as hardware or software or be implemented as a combination of hardware and software. In addition, a plurality of 'modules' or a plurality of '~ers/ors' may be integrated in at least one module and be implemented as at least one processor except for a 'module' or an '~er/or' that needs to be implemented as specific hardware.

On the other hand, various elements and regions in the drawings are schematically illustrated. Therefore, the technical spirit of the disclosure is not limited by relatively sizes or intervals illustrated in the accompanying drawings.

The electronic device according to diverse embodiments of the disclosure may include at least one of, for example, a smartphone, a tablet personal computer (PC), a desktop PC, a laptop PC, or a wearable device. The wearable device may include at least one of an accessory type wearable device (e.g., a watch, a ring, a bracelet, an ankle bracelet, a necklace, a glasses, a contact lens, or a head-mounted-device (HMD)), a textile or clothing integral type wearable device (e.g., an electronic clothing), a body attachment type wearable device (e.g., a skin pad or a tattoo), or a bio-implantable circuit.

In some embodiments, the electronic device may include at least one of, for example, a television (TV), a digital video disk (DVD) player, an audio player, a refrigerator, an air conditioner, a cleaner, an oven, a microwave oven, a washing machine, an air cleaner, a set-top box, a home automation control panel, a security control panel, a media box (e.g., HomeSync™ of Samsung Electronics Co., Ltd, TV™ of Apple Inc, or TV™ of Google™), a game console (e.g., Xbox™ and PlayStation™), an electronic dictionary, an electronic key, a camcorder, or a digital photo frame.

In other embodiments, the electronic device may include at least one of various medical devices (e.g., various portable medical measuring devices (such as a blood glucose meter, a heart rate meter, a blood pressure meter, a body temperature meter, and the like), a magnetic resonance angiography (MRA), a magnetic resonance imaging (MRI), a computed tomography (CT), a photographing device, an ultrasonic device, and the like), a navigation device, a global navigation satellite system (GNSS), an event data recorder (EDR), a flight data recorder (FDR), an automobile infotainment device, marine electronic equipment (e.g., a marine navigation device, a gyro compass, and the like), avionics, a security device, an automobile head unit, an industrial or household robot, a drone, an automatic teller machine (ATM) of a financial institute, a point of sales (POS) of a shop, or Internet of things (IoT) devices (e.g., a light bulb, various sensors, a sprinkler system, a fire alarm, a thermostat, a street light, a toaster, exercise equipment, a hot water tank, a heater, a boiler, and the like).

Hereinafter, embodiments of the disclosure will be described in detail with reference to the accompanying drawings so that those skilled in the art to which the disclosure pertains may easily practice the disclosure.

FIG. 1 is a flowchart illustrating a controlling method of an electronic device according to an embodiment of the disclosure.

Figure 2:
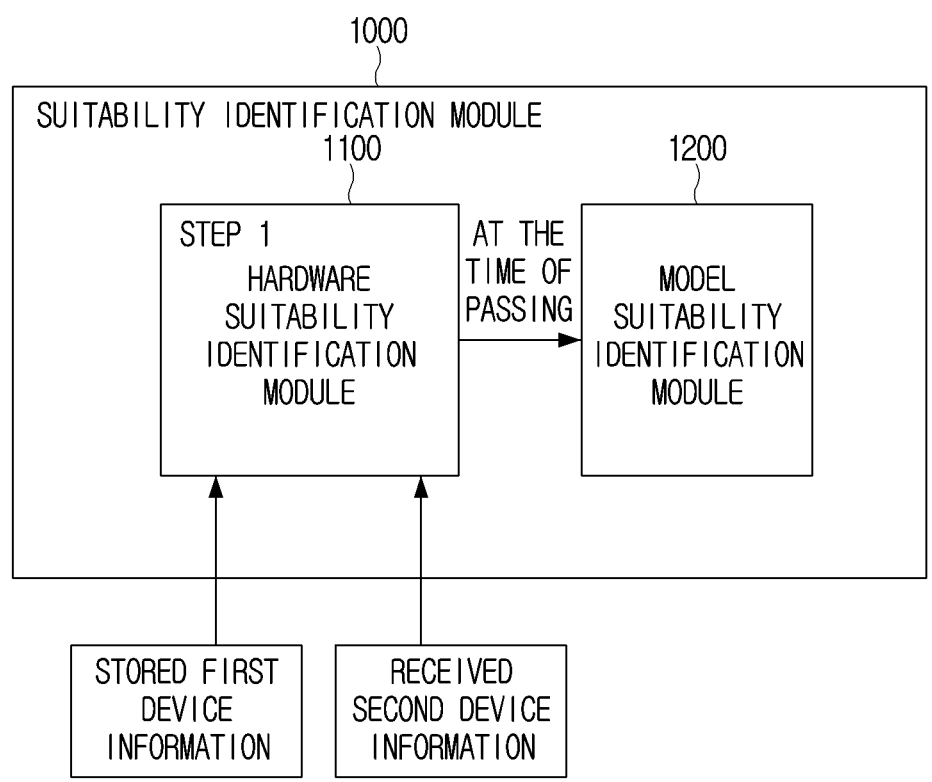
FIGS. 2, 3 and 4 are diagrams for specifically describing an operation of a hardware suitability identification module for performing the controlling method of the electronic device according to FIG. 1 according to various embodiments of the disclosure.
Figure 3:
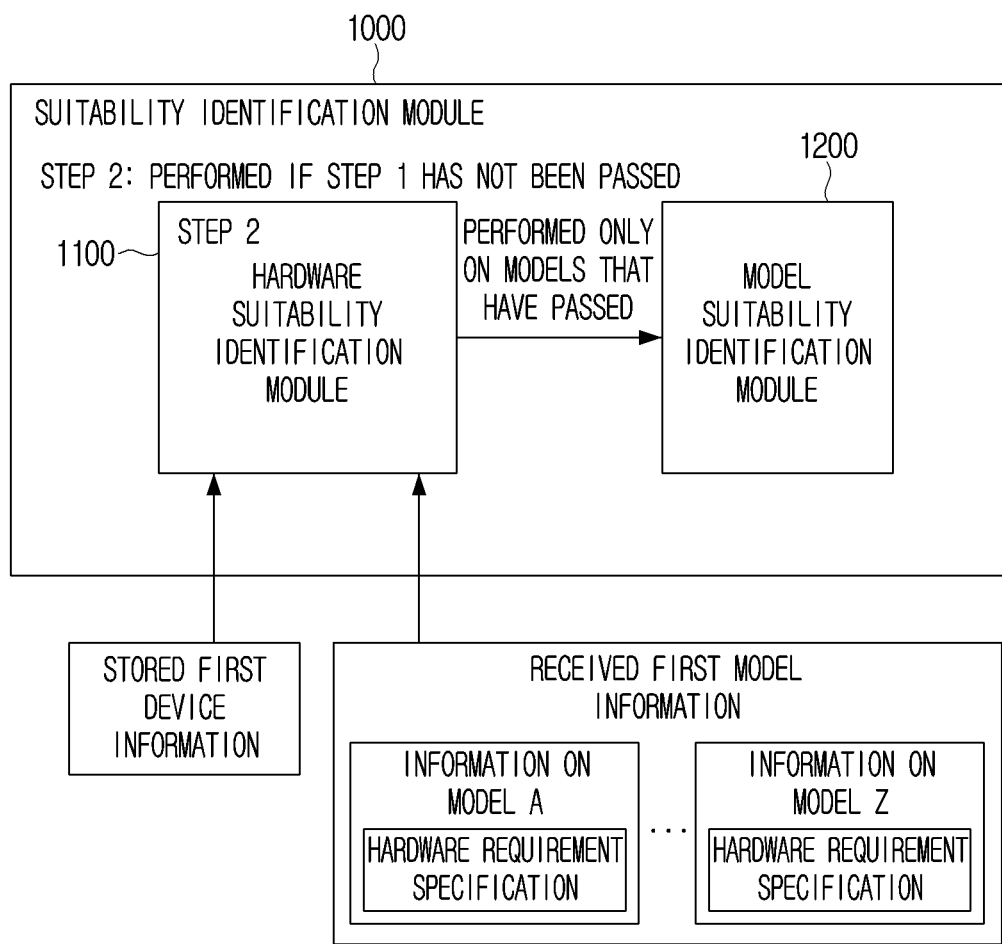
Figure 4:
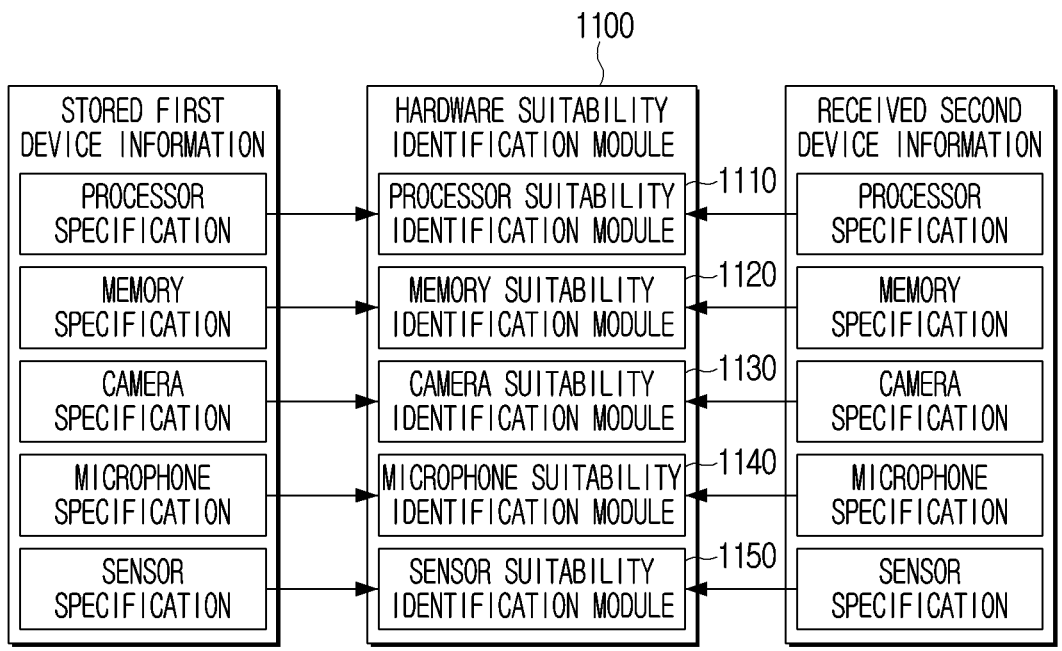

FIGS. 2 to 4 are diagrams for specifically describing an operation of a hardware suitability identification module 1100 (see FIG. 2) for performing the controlling method of an electronic device 100 (see FIG. 17) according to FIG. 1 according to various embodiment of the disclosure.

First, the 'electronic device' according to the disclosure may be implemented in various types, such as a smart phone, a tablet PC, a notebook, a TV, and a robot, and is not limited to a specific type of device. Hereinafter, the electronic device according to the disclosure is referred to as the electronic device 100.

A 'neural network model' refers to an artificial intelligence model including an artificial neural network, and may be trained by deep learning. For example, the neural network model may include at least one artificial neural network model of a deep neural network (DNN), a convolution neural network (CNN), a recurrent neural network (RNN), or a generative adversarial network (GAN). However, the neural network model according to the disclosure is not limited to the above-described examples.

In the electronic device 100 according to the disclosure, first device information on a hardware specification of the electronic device 100 and a hardware suitability identification module 1100 may be stored.

The 'first device information' refers to information on the hardware specification of the electronic device 100. Specifically, the first device information is a term for generically referring to information on a specification indicating what kind of performance each of the plurality of hardware included in the electronic device 100 has, and may include detailed information on the presence, number, type, and performance of each of a plurality of hardware components included in the electronic device 100.

In particular, the first device information may include information on a specification of a processor included in the electronic device 100, a specification of a memory included in the electronic device 100, and a specification of a data acquirer included in the electronic device 100. The data acquirer is a component that acquires data input to one or more neural network models included in the electronic device 100, and may include at least one of a camera, a microphone, or a sensor included in the electronic device 100.

The first device information may include performance evaluation information on each of the plurality of hardware included in the electronic device 100. The 'performance evaluation information' is a score obtained by comprehensively evaluating the performance of each hardware configuration based on experimentation and analysis by an expert, and may be previously stored in the electronic device 100 and may be received and updated from an external server.

The 'hardware suitability identification module 1100' refers to a module that identifies a neural network model suitable for hardware of the electronic device 100. Specifically, the 'hardware suitability identification module 1100' may output information on whether it is suitable to execute a neural network model included in an external device by using hardware of the electronic device 100. In describing the disclosure, the term 'suitable' may be replaced with terms such as 'compatible' or 'alternative'.

Referring to FIG. 1, when a user input is received, the electronic device 100 may transmit a first signal for requesting information related to one or more neural network models included in one or more external devices at operation S110.

The 'user input' may be received based on a user touch input through a display of the electronic device 100, a user voice received through a microphone of the electronic device 100 or an input of a physical button provided in the electronic device 100, a control signal transmitted by a remote control device for controlling the electronic device 100, and the like. The term 'transmission' may be used as a meaning including unicasting in which signals or data are transmitted by targeting a specific external device, and broadcasting in which the signals or data are simultaneously transmitted to all external devices connected to a network without targeting the specific external device when transmitting the signals or data. The 'information related to one or more neural network models' may include second device information and first model information, which will be described later.

Like the electronic device 100, the 'external device' may be implemented in various types, such as a smart phone, a tablet PC, a laptop, a TV, and a robot, and the type of the external device may also be different from the type of the electronic device 100. The electronic device 100 and the external device may be 'connected' to each other, which means that a communication connection is established as a result of exchanging a request and a response for communication connection between the electronic device 100 and the external device. The method of communication connection according to the disclosure is not particularly limited.

As a response to the first signal, the electronic device 100 may receive a second signal including second device information on a hardware specification of the first external device and first model information on one or more neural network models included in the first external device from the first external device among one or more external devices at operation S120. That is, if a first signal corresponding to a request to search for one or more neural network models is received, the first external device may transmit the second signal to the electronic device 100 as the response to the request, and the second signal may include the second device information and the first model information. In describing the disclosure, the term 'first external device' is used as a term for specifying an external device capable of transmitting installation data of a neural network model to the electronic device 100. Hereinafter, the first external device according to the disclosure will be referred to as a first external device 200-1 (See FIG. 14).

The first external device 200-1 may perform a user authentication process based on the first user information included in the first signal and the second user information stored in the first external device 200-1, and may also transmit the second signal to the electronic device 100 when the user authentication is completed. The user authentication process or user suitability identification process will be described in detail with reference to FIGS. 9 and 10.

The 'second device information' refers to information on the hardware specification of the first external device 200-1. Specifically, the second device information is a term for generically referring to information on specifications indicating what kind of performance each hardware included in the first external device 200-1 has, and corresponds to the first device information on the hardware performance of the electronic device 100.

That is, the second device information may include detailed information on the presence, a number, a type, and a performance of each of a plurality of hardware configurations included in the first external device 200-1, and similar to the case of the first device information, the second device information may also include performance evaluation information for each hardware included in the first external device 200-1. In addition, the second device information may include information on a specification of a processor included in the first external device 200-1, a specification of a memory included in the first external device 200-1, and a specification of a data acquirer included in the first external device 200-1. The data acquirer of the first external device 200-1 is a component that acquires data input to one or more neural network models included in the first external device 200-1, similar to the data acquirer of the electronic device 100, and may include at least one of a camera, a microphone, or a sensor included in the first external device 200-1.

The 'first model information' refers to information on one or more neural network models included in the first external device 200-1. Specifically, the first model information may include information on a service type, information on a personalization level, and information on a hardware requirement specification of each of the one or more neural network models included in the first external device 200-1.

If the second signal including the second device information and the first model information is received from the first external device 200-1, the electronic device 100 may input the first device information, the second device information, and the first model information into the hardware suitability identification module 1100 at operation S130 to identify whether each of the one or more neural network models included in the first external device 200-1 is suitable for hardware of the electronic device 100. That is, if the first device information, the second device information, and the first model information are input, the hardware suitability identification module 1100 may perform a hardware suitability identification process according to diverse embodiments of the disclosure based on the first device information, the second device information, and the first model information. Hereinafter, the 'hardware suitability identification process' will be described in detail with reference to FIGS. 2 to 4 together with FIG. 1. Specifically, the hardware suitability identification process according to the disclosure may include operations 1 and 2 as illustrated in FIGS. 2 and 3 according to an embodiment of the disclosure.

First, 'step 1' will be described with reference to FIGS. 1 and 2. The electronic device 100 may perform the hardware suitability identification process for all neural network models included in the first external device 200-1, by identifying whether the hardware specification of the electronic device 100 is equal to or superior to the hardware specification of the first external device 200-1 in all parts based on the first device information stored in the electronic device 100 and the second device information received from the first external device 200-1.

Specifically, if the specification of each of the plurality of hardware configurations included in the electronic device 100 is greater than or equal to the specifications of the plurality of hardware configurations included in the first external device 200-1 (Y in S140), the electronic device 100 may identify the one or more neural network models included in the first external device 200-1 as suitable for hardware of the electronic device 100 at operation S150-1.

That is, the electronic device 100 may identify the hardware configuration of the first external device 200-1 corresponding to each of the plurality of hardware configurations included in the electronic device 100, and may compare specifications of each corresponding hardware configuration. In addition, as a result of comparing the specification of each of the plurality of hardware configurations included in the electronic device 100 with the specification of each of the plurality of hardware configurations included in the first external device 200-1, if the specification of each of the plurality of hardware configurations included in the electronic device 100 is greater than or equal to the specifications of the plurality of hardware configurations included in the first external device 200-1, this may be estimated as a case in which all of the one or more neural network models included in the first external device 200-1 may be executed using the hardware of the electronic device 100, regardless of which hardware specification each of the one or more neural network models included in the first external device 200-1 requires. Therefore, in this case, the electronic device 100 may identify all of the one or more neural network models included in the first external device 200-1 as suitable for the hardware of the electronic device 100.

Referring to FIG. 4, the hardware suitability identification module 1100 may include a processor suitability identification module 1110, a memory suitability identification module 1120, a camera suitability identification module 1130, a microphone suitability identification module 1140, and a sensor suitability identification module 1150. In addition, the electronic device 100 may perform a hardware suitability identification process for each hardware configuration based on information on the processor specifications, the memory specifications, the camera specifications, the microphone specifications, and the sensor specifications included in each of the first and second device information through each of the modules included in the hardware suitability identification module 1100.

For example, if the specifications of the processor, the memory, the camera, the microphone, and the sensor included in the electronic device 100 are all greater than or equal to the specifications of the processor, the memory, the camera, the microphone, and the sensor included in the first external device 200-1, the electronic device 100 may identify all of the one or more neural network models included in the first external device 200-1 as suitable for the hardware of the electronic device 100. At this time, the electronic device 100 may perform the hardware suitability identification process for each hardware configuration in the order of the processor, the memory, the camera, the microphone, and the sensor, but there is no particular order restriction in the hardware suitability identification process for each hardware configuration according to the disclosure.

In the above, it has been described that the specifications of the processor, memory, camera, microphone, and sensor included in each of the electronic device 100 and the first external device 200-1 are compared, but this is only for convenience of description, and the electronic device 100 may compare specifications of each of the detailed components included in each of the processor, memory, camera, microphone, and sensor according to the disclosure.

For example, the electronic device 100 may also perform the hardware suitability identification process by comparing the specifications of the electronic device 100 and the first external device 200-1 for a central processing unit (CPU), a graphic processing unit (GPU), and a neural processing unit (NPU) among the processors, comparing the specifications of the electronic device 100 and the first external device 200-1 for a random access memory (RAM) and a read only memory (ROM) among the memories, and comparing the specifications of the electronic device 100 and the first external device 200-1 for each sensor such as a global positioning system (GPS) sensor, a gyro sensor, an acceleration sensor, and a lidar sensor among the sensors. Examples of the detailed components included in each of the processor, memory, camera, microphone, and sensor are not limited to the above-described examples.

According to an embodiment of the disclosure, that the specification of the hardware configuration included in the electronic device 100 is greater than or equal to the specification of the hardware configuration included in the first external device 200-1 may mean that all specifications indicating the performance of the hardware configuration included in the electronic device 100 are superior to or at least equal to all specifications indicating the performance of the hardware configuration included in the first external device 200-1.

For example, if the number of cores of the CPU included in the electronic device 100 is 8, the number of threads is 16, a clock speed is 3.6 GHZ, and a capacity of a cache memory is 8 MB, and the number of cores of the CPU included in the first external device 200-1 is 4, the number of threads is 8, a clock speed is 3.3 GHZ, and a capacity of a cache memory is 8 MB, the electronic device 100 may identify that the performance of the CPU of the electronic device 100 is greater than or equal to the performance of the CPU of the first external device 200-1. In the example, the number of cores, the number of threads, the clock speed, and the cache memory are exemplified as performance indicators of the CPU, but the performance indicators such as a bus speed and thermal design power (TDP) may be additionally considered.

According to another embodiment, that the specification of the hardware configuration included in the electronic device 100 is greater than or equal to the specification of the hardware configuration included in the first external device 200-1 may mean that the performance evaluation information indicating the performance of the hardware configuration included in the electronic device 100 is higher than the performance evaluation information indicating the performance of the hardware configuration included in the first external device 200-1. As described above, the performance evaluation information is the score obtained by comprehensively evaluating the performance of each hardware configuration based on experiments and analysis by the expert, and may be included in the first device information and the second device information. For example, if the CPU included in the electronic device 100 has the score according to the performance evaluation information of 97, and the CPU included in the first external device 200-1 has the score according to the performance evaluation information of 86, the electronic device 100 may identify that the performance of the CPU of the electronic device 100 is higher than the performance of the CPU of the first external device 200-1.

Secondly, 'operation 2' will be described with reference to FIGS. 1 and 3 according to an embodiment of the disclosure. The electronic device 100 may perform the hardware suitability identification process for each neural network model included in the first external device 200-1, by identifying whether the hardware specification of the electronic device 100 is equal to or superior to the hardware requirement specification of each of the one or more neural network models included in the first external device 200-1 based on the first device information stored in the electronic device 100 and the first model information received from the first external device 200-1.

Referring to FIG. 3, step 2 of the hardware suitability identification process may be performed only when step 1 of the hardware suitability identification process as described above is not passed. That is, as a result of performing step 1 of the hardware suitability identification process as described above, if it is identified that at least one neural network model among the one or more neural network models included in the first external device 200-1 is not suitable for the hardware of the electronic device 100, the electronic device 100 may perform step 2 of the hardware suitability identification process.

Specifically, if at least one specification of the plurality of hardware configurations included in the electronic device 100 is less than the specifications of the plurality of hardware configurations included in the first external device 200-1 (N in S140), the electronic device 100 may identify at least one neural network model having a hardware requirement specification lower than the specifications of the plurality of hardware configurations included in the electronic device 100 among the one or more neural network models included in the first external device 200-1 as suitable for the hardware of the electronic device 100 at operation S150-2.

That is, as a result of comparing the specification of each of the plurality of hardware configurations included in the electronic device 100 with the specification of each of the plurality of hardware configurations included in the first external device 200-1, if the specification of at least one of the plurality of hardware configurations included in the electronic device 100 is less than the specifications of the plurality of hardware configurations included in the first external device 200-1, this may be said to be a case in which all neural network models suitable for execution using hardware of the electronic device 100 may be identified only when the hardware requirement specification of each of the one or more neural network models included in the first external device 200-1 with the specifications of the plurality of hardware configurations included in the electronic device 100 are individually compared.

Therefore, in this case, the electronic device 100 may identify whether all hardware requirement specifications of the one or more neural network models included in the first external device 200-1 are less than the specifications of the plurality of hardware configurations included in the electronic device 100 by comparing the hardware requirement specification of the neural network model and the specifications of the plurality of hardware configurations included in the electronic device 100 for each of the one or more neural network models included in the first external device 200-1.

For example, if all of the hardware requirement specifications of the first neural network model included in the first external device 200-1 are less than the specifications of the plurality of hardware configurations included in the electronic device 100, the electronic device 100 may identify the first neural network model as suitable for the hardware of the electronic device 100. On the other hand, if at least one of the hardware requirement specifications of the second neural network model included in the first external device 200-1 is greater than or equal to the specifications of the plurality of hardware configurations included in the electronic device 100, the electronic device 100 may identify the second neural network model as not suitable for the hardware of the electronic device 100. As described above, the information on the hardware requirement specification of each of the one or more neural network models included in the first external device 200-1 may be included in the first model information received from the first external device 200-1.

Various methods of comparing the specifications of the plurality of hardware configurations included in the electronic device 100 with the specification of each of the plurality of hardware configuration included in the first external device 200-1 in step 1 may be applied to a method of comparing the specifications of the plurality of hardware configurations included in the electronic device 100 with the hardware requirement specifications of the one or more neural network models included in the first external device 200-1 in step 2 as it is. Therefore, a redundant description of the method of comparing the specifications of the plurality of hardware configurations included in the electronic device 100 with the hardware requirement specifications of the one or more neural network models included in the first external device 200-1 in step 2 is omitted.

In comparing the hardware requirement specification of each of the one or more neural network models included in the first external device 200-1 and the specifications of the plurality of hardware configurations included in the electronic device 100, a hardware specification of the electronic device 100 at the time of product release may be compared with the hardware requirement specification of each of the one or more neural network models included in the first external device 200-1, but the hardware specification of the electronic device 100 available at the time of comparing the hardware requirement specification of each of the one or more neural network models included in the first external device 200-1 with the specifications of the plurality of hardware configurations included in the electronic device 100 may also be compared with the hardware requirement specification of each of the one or more neural network models included in the first external device 200-1.

As described above, the comparing of the specifications of the plurality of hardware configurations included in the electronic device 100 with the specifications of the plurality of hardware configurations included in the first external device 200-1 in step 1 is based on the premise that the respective configurations corresponds to each other and a comparison object exists. That is, if there is a hardware configuration included in the first external device 200-1 but not included in the electronic device 100, the electronic device 100 may perform the hardware suitability identification process according to step 2 unless the hardware configuration may be replaced with another hardware configuration included in the electronic device 100.

Further, as described above, the comparing of the specifications of the plurality of hardware configurations included in the electronic device 100 with the hardware requirement specifications of the one or more neural network models included in the first external device 200-1 in step 2 is also based on the premise that the respective configurations corresponds to each other and a comparison object exists. That is, if there is a hardware configuration that is requested in the hardware requirement specification of the neural network model of the first external device 200-1 but is not included in the electronic device 100, the electronic device 100 may identify the neural network model as not suitable for the hardware of the electronic device 100 unless the hardware configuration may be replaced with another hardware configuration included in the electronic device 100.

As described above, if at least one neural network model suitable for the hardware of the electronic device 100 is identified among the one or more neural network models included in the first external device 200-1, the electronic device 100 may transmit a third signal including a request for installation data of the one or more identified neural network models to the first external device 200-1 at operation S160. In addition, as a response to the third signal, the electronic device 100 may receive a fourth signal including the installation data of the at least one neural network model identified as suitable for the hardware of the electronic device 100 from the first external device 200-1 at operation S170)

That is, if the third signal including the request for installation data of the one or more identified neural network models is transmitted to the first external device 200-1, the first external device 200-1 may transmit the installation data of the one or more identified neural network models to the electronic device 100. In addition, if the installation data of the one or more identified neural network models is received, the electronic device 100 may install the one or more identified neural network models based on the received installation data. Accordingly, the electronic device 100 may execute at least one neural network model personalized by the first external device 200-1 in the electronic device 100 by replacing one or more of the plurality of neural network models included in the electronic device 100 with the one or more identified neural network models. The personalization of the neural network model will be described later with reference to FIGS. 5A to 8 according to an embodiment of the disclosure.

Specifically, the installation data received from the first external device 200-1 may include identification information for each of the one or more identified neural network models and configuration information necessary to install the one or more identified neural network models. The 'configuration information' may include information on the structure and type of the neural network included in the neural network model, the number of layers included in the neural network, the number of nodes for each layer, a weight value of each node, and a connection relationship between a plurality of nodes.

Meanwhile, "installing" the neural network models may include "switching" the neural network models included in the electronic device 100 into the neural network models of the first external device 200-1. In addition, the 'switching' of the neural network models included in the electronic device 100 into the neural network models included in the external device may include the case of replacing some of the neural network models of the electronic device 100 with some of the neural network models of the external device, such as the case of changing only the weight values of nodes included in the neural network model of the electronic device 100 to the weight values of nodes included in the neural network model of the external device, as well as the case of replacing the entire neural network model of the electronic device 100 with the entire neural network model of the external device.

According to the diverse embodiments as described above with reference to FIGS. 1 to 4, when the neural network model is transferred from the external device, the electronic device 100 may determine whether to transfer the neural network model by identifying whether it is suitable to execute the neural network model using the hardware of the electronic device 100, and accordingly, the efficiency and reliability of transfer learning may be significantly improved.

Figure 5A:
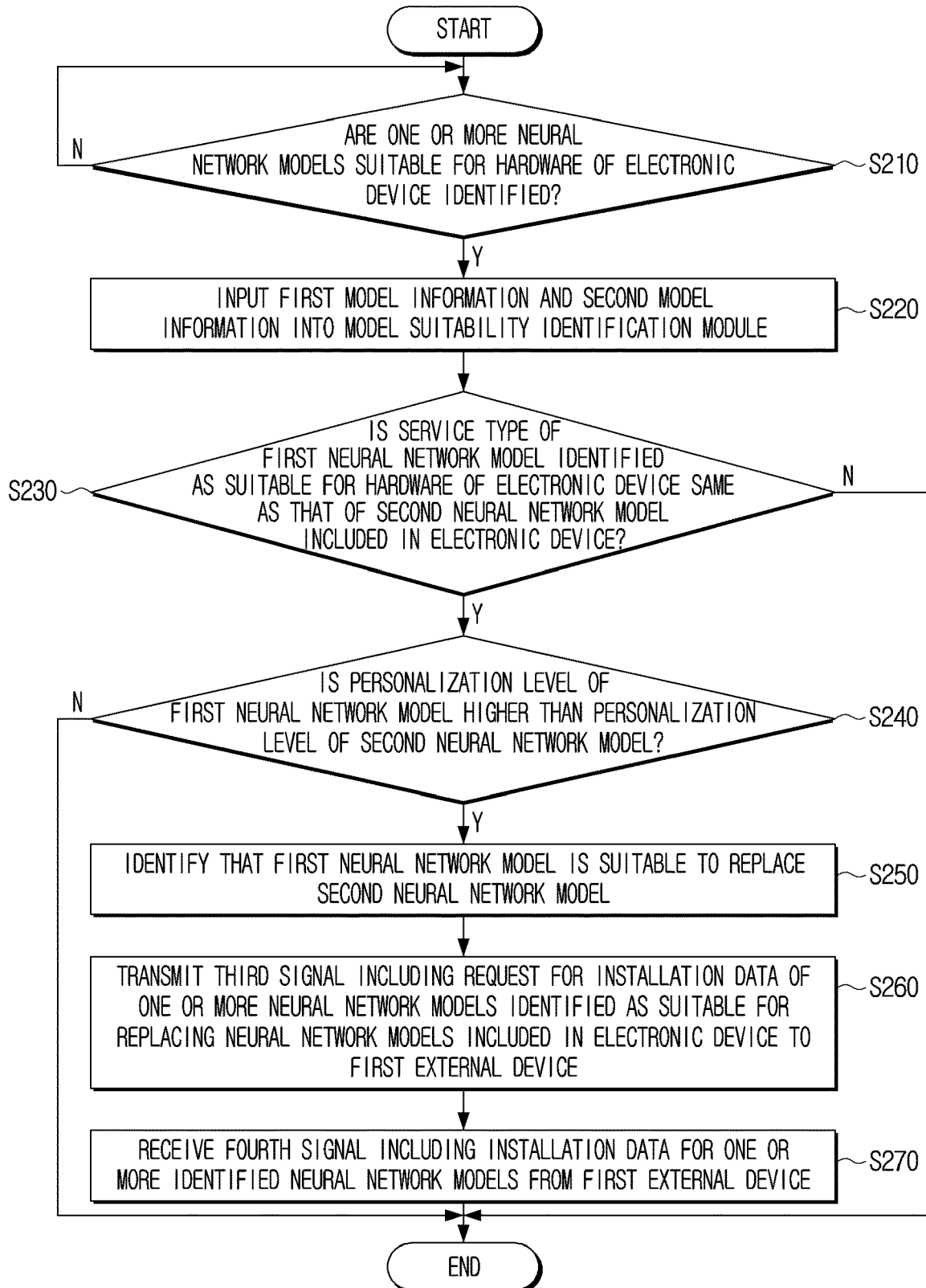
FIG. 5A is a flowchart illustrating a controlling method of an electronic device according to an embodiment of the disclosure.

FIG. 5A is a flowchart illustrating a controlling method of an electronic device according to an embodiment of the disclosure.

Figure 5B:
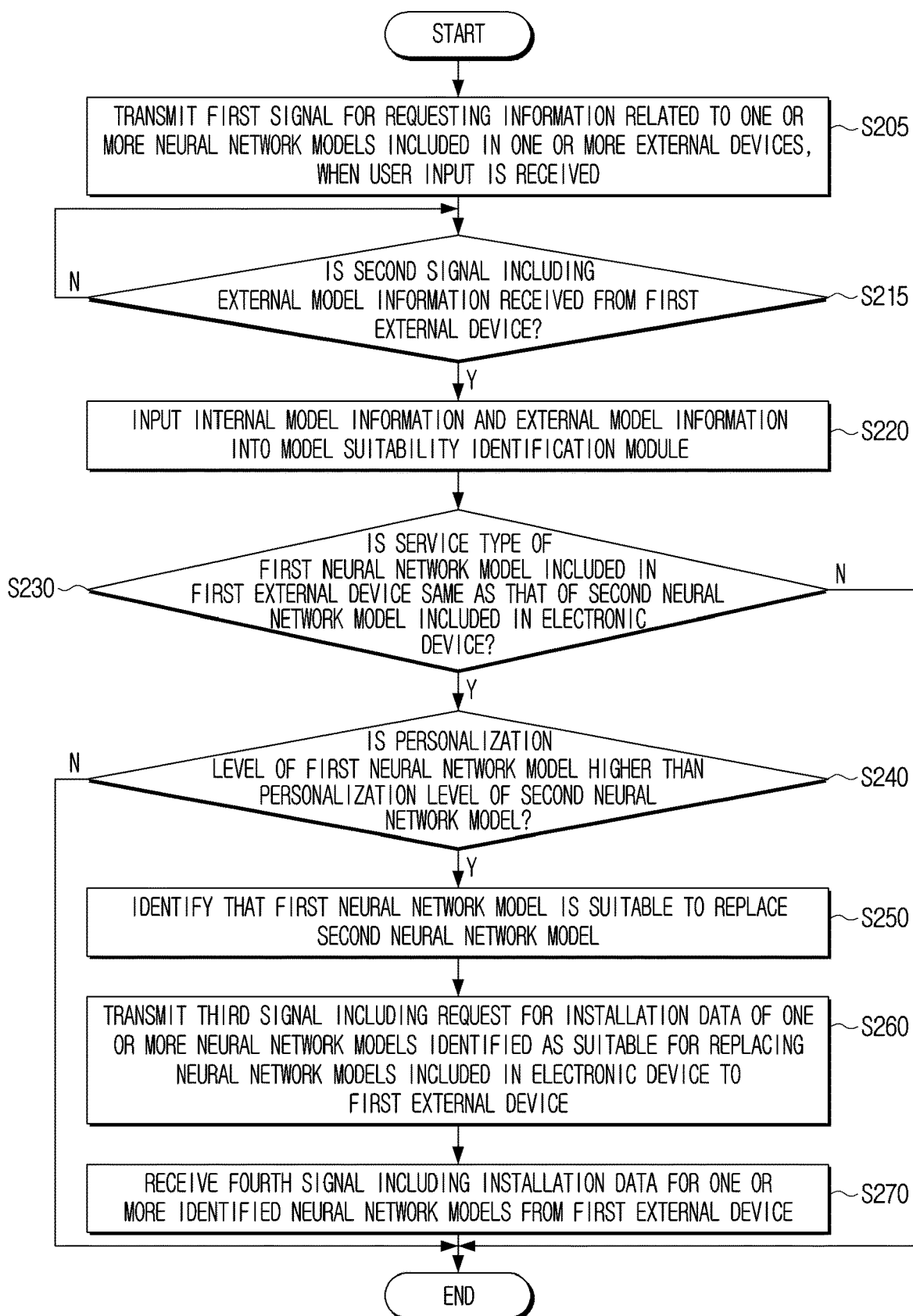
FIG. 5B is a flowchart illustrating a controlling method of an electronic device according to an embodiment of the disclosure.

FIG. 5B is a flowchart illustrating a controlling method of an electronic device according to an embodiment of the disclosure.

Figure 6:
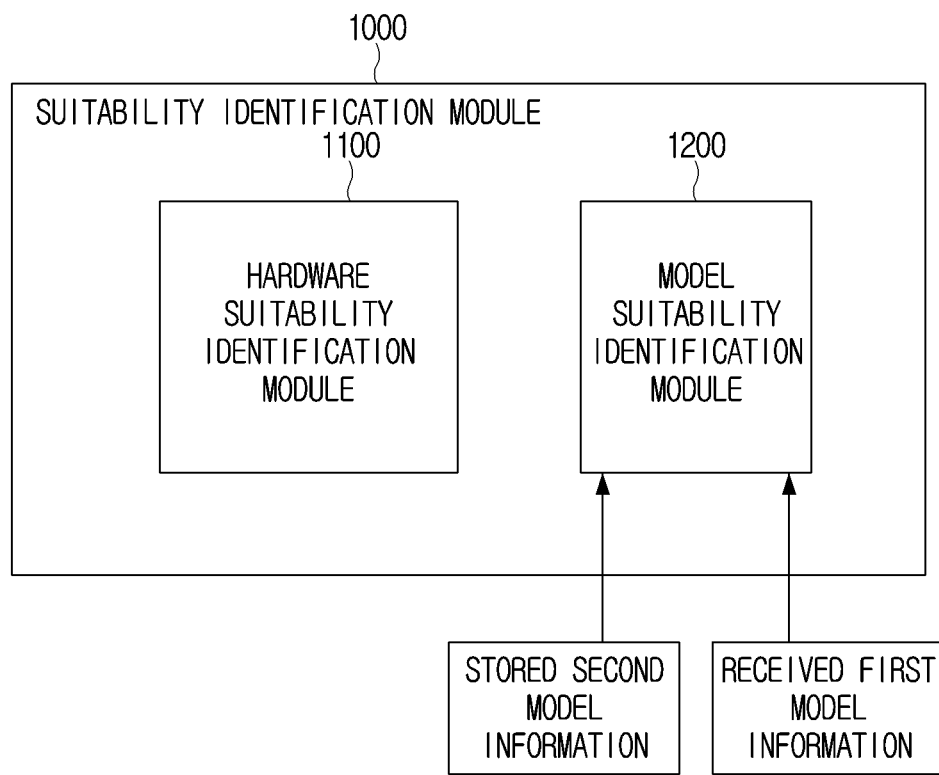
FIGS. 6, 7 and 8 are diagrams for specifically describing an operation of a model suitability identification module for performing the controlling method of the electronic device according to FIGS. 5A and 5B according to various embodiments of the disclosure.
Figure 7:
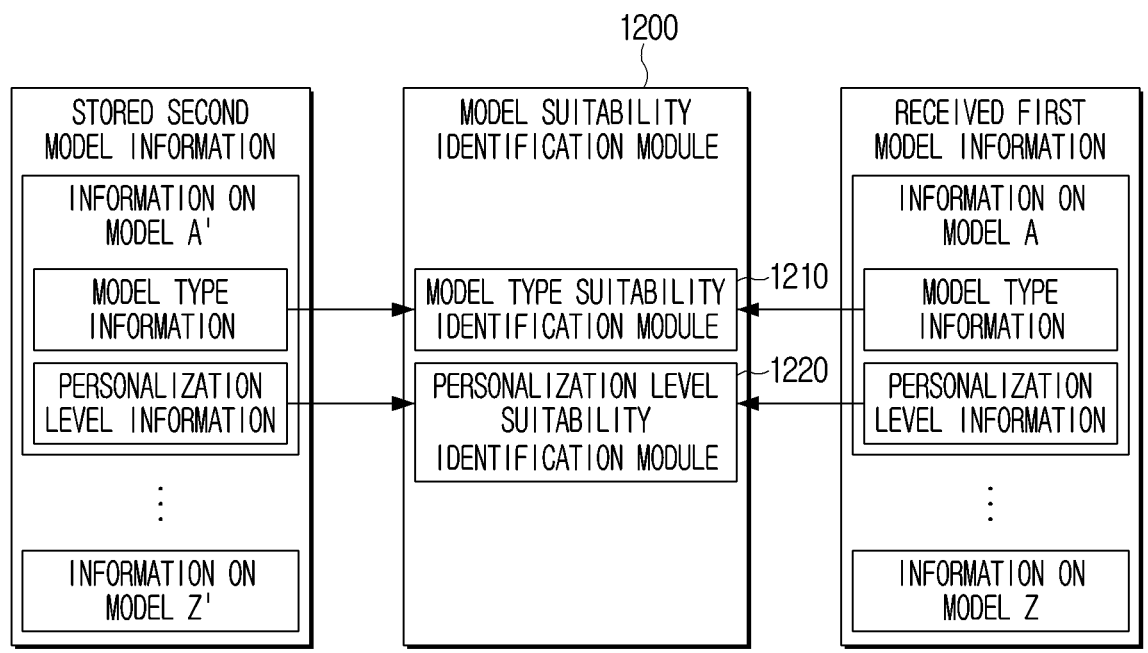
Figure 8:
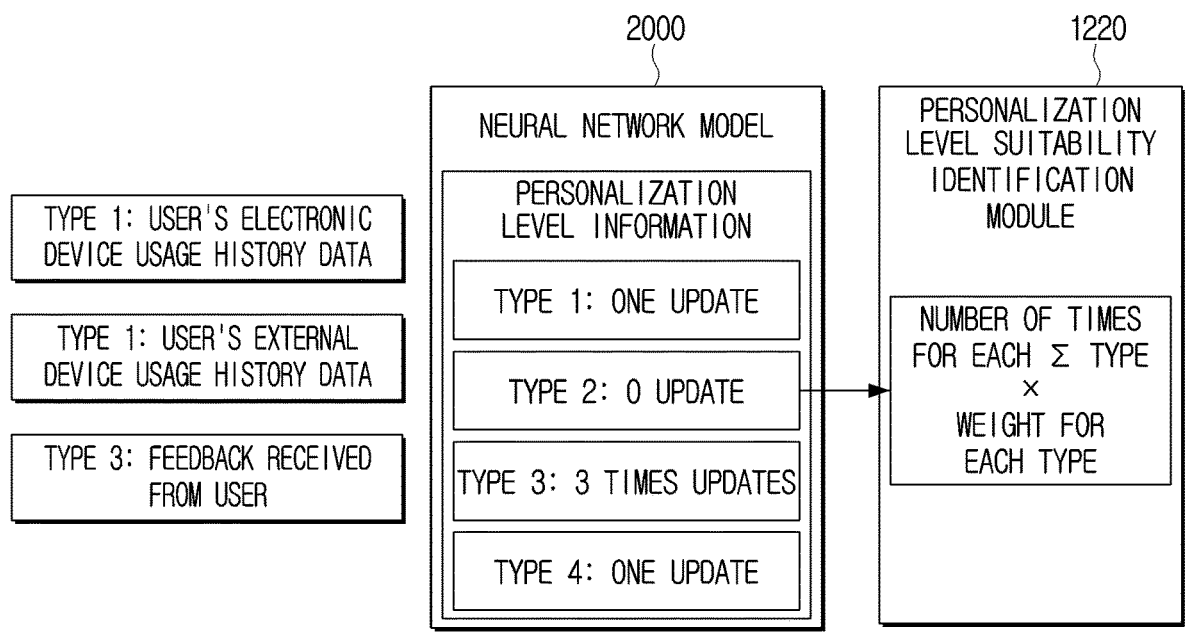

FIGS. 6 to 8 are diagrams for specifically describing an operation of a model suitability identification module for performing the controlling method of an electronic device according to FIG. 5A according to various embodiments of the disclosure.

In the above, the hardware suitability identification process according to the disclosure has been described with reference to FIGS. 1 to 4. However, according to another embodiment of the disclosure, the electronic device 100 may perform a 'model suitability identification process' for each of the neural network models included in the first external device of the electronic device 100. Hereinafter, the model suitability identification process according to the disclosure will be described in detail with reference to FIGS. 5A to 8.

First, the electronic device 100 may further store second model information and a model suitability identification module 1200 as well as the first device information, the second device information, and the hardware suitability identification module 1100 as described above.

The 'second model information' refers to information on one or more neural network models included in the electronic device 100. Specifically, the second model information may include information on a service type and information on a personalization level of each of the one or more neural network models included in the electronic device 100.

The 'model suitability identification module 1200' refers to a module that identifies a neural network model suitable for replacing the neural network model included in the electronic device 100. Referring to FIG. 6, the 'model suitability identification module 1200' may output information on whether it is suitable to replace the neural network model included in the electronic device 100 with the neural network model included in the external device, based on the second model information stored in the electronic device 100 and the first model information received from the first external device 200-1.

Referring to FIG. 5A, if one or more neural network models suitable for hardware of the electronic device 100 are identified (U in S210), the electronic device 100 may input the first model information and the second model information into the model suitability identification module 1200 at operation S220 to identify whether each of the one or more neural network models identified as suitable for the hardware of the electronic device 100 is suitable to replace the neural network model included in the electronic device 100.

Specifically, the model suitability identification process according to the disclosure may include two processes performed through each of a model type suitability identification module 1210 and a personalization level suitability identification module 1220 as illustrated in FIG. 7, and thus, hereinafter, after each process included in the model suitability identification process will be described in detail, a controlling method according to an embodiment of the disclosure will be described again.

First, the model type suitability identification module 1210' may identify neural network models having the same service type by comparing the service type of each of the one or more neural network models included in the electronic device 100 with the service type of each of the one or more neural network models identified as suitable for the hardware of the electronic device 100 based on the information on the service type included in each of the first model information and the second model information, as illustrated in FIG. 7.

The 'type of neural network model' may be classified according to input/output information for the neural network model and a function of the neural network model accordingly. For example, when both the first neural network model and the second neural network model are neural network models that provide a voice recognition service by inputting a voice signal according to a user's utterance and outputting a text corresponding to a user's voice, the model type suitability identification module 1210 may identify that the service type of the first neural network model and the service type of the second neural network model are the same as each other.

Secondly, the 'personalization level suitability identification module 1220' may identify a neural network model having a high personalization level of among the neural network models having the same service type by comparing the personalization level between the neural network models having the same service type based on the information on the personalization level included in each of the first model information and the second model information, as illustrated in FIG. 7.

The 'personalization level of the neural network model' refers to the degree to which the neural network model is updated according to the user as the neural network model is trained based on personalization data related to the user of the electronic device 100 after the neural network model is installed in the electronic device 100. The 'personalized data' refers to training data used for personalization of a neural network models included in the external device. An operation of the personalization level suitability identification module 1220 will be described in more detail with reference to FIGS. 7 and 8 according to an embodiment of the disclosure.

Specifically, the personalization level may be determined based on 'information on a user's history'. The information on the user's history may include information on the number of times, frequency and duration of use of the neural network model used by the user. For example, if the second neural network model included in the electronic device 100 is used 100 times for 1 month, this may be determined to have a higher personalization level than when the first neural network model included in the external device is used 30 times for 1 month or is used 100 times for 2 months.

Referring to FIG. 8, the information on the history of the user using a neural network model 2000 included in the electronic device 100 may include the case in which the user uses the neural network model 2000 based on data acquired through another electronic device 100 connected to the electronic device 100 (type 2 in FIG. 8) as well as the case in which the user uses the neural network model 2000 included in the electronic device 100 based on data acquired through the electronic device 100 (type 1 in FIG. 8).

For example, the case in which the neural network model 2000 included in a smart phone is used as an image acquired by the user through a robot cleaner connected to the smart phone is transmitted to the smart phone, as well as the case in which user uses the neural network model 2000 included in the smart phone based on the image acquired through the smart phone may be included in the history of using neural network model 2000 included in smart phone.

The personalization level may also be determined based on 'information on a user's feedback'. The information on the user's feedback may include direct evaluation information input for the user's use result after using the neural network model 2000 and indirect evaluation information related to the use result (type 3 in FIG. 8).

For example, when the user directly inputs positive evaluation information for an application including the neural network model 2000 after the neural network model 2000 is used in the electronic device 100, the personalization level of the neural network model 2000 may increase. On the other hand, when the user directly inputs negative evaluation information for the application including the neural network model 2000 after the neural network model 2000 is used in the electronic device 100, the personalization level of the neural network model 2000 may increase. On the other hand, when the user input of the same content is repeatedly input to the neural network model 2000, it is possible to indirectly confirm that the user was not satisfied with the output of the neural network model 2000, and thus, the personalization level of the neural network model 2000 may decrease.

The personalization level may be quantitatively calculated according to a weighted sum of various types of information for evaluating the personalization level as described above. Specifically, referring to FIG. 8, the personalization level may be calculated by summing values obtained by multiplying each 'number of times for each type' and a preset 'weight for each type' for evaluating the personalization level.

For example, when the user inputs the direct evaluation information for the application including the neural network model 2000, the highest weight may be assigned, when data acquired from the electronic device 100, such as an image captured using the camera of the electronic device 100 or a voice acquired using the microphone of the electronic device 100, is input to the neural network model 2000, the second highest weight may be assigned, and when data received from another electronic device 100 connected to the electronic device 100 other than the electronic device 100 is input to the neural network model 2000, the third highest weight may be assigned. In addition, the value obtained by multiplying the number of times for each type as above by the weight for each type may become the weighted sum for each type, and a value obtained by adding the weighted sums for each type for all types may be a quantitative value indicating the personalization level of the neural network model 2000.

Referring back to FIG. 5A, if the service type of the first neural network model among the one or more neural network models identified as suitable for the hardware of the electronic device 100 is the same as the service type of the second neural network model among the plurality of neural network models included in the electronic device 100 (Y in operation S230), the electronic device 100 may compare the personalization level of the first neural network model and the personalization level of the second neural network model based on the information on the personalization levels included in each of the first model information and the second model information. In addition, if the personalization level of the first neural network model is higher than the personalization level of the second neural network model (Y in operation S240), it may be identified that the first neural network model is suitable to replace the second neural network model at operation S250.

If the model suitability identification process as described above is performed, the electronic device 100 may transmit a third signal including a request for installation data of at least one neural network model identified as suitable for replacing the neural network model included in the electronic device 100 to the first external device 200-1 at operation S260. That is, when the third signal is transmitted to the first external device 200-1 after performing not only the hardware suitability identification process but also the model suitability identification process, the third signal may include the request for installation data of at least one neural network model identified as the model suitability identification process is performed.

As a response to the third signal, the electronic device 100 may receive a fourth signal including the installation data of the one or more identified neural network models from the first external device 200-1 at operation S270. That is, when the third signal is transmitted to the first external device 200-1 after performing not only the hardware suitability identification process but also the model suitability identification process, the fourth signal received as the response to the third signal may include the installation data of at least one neural network model identified as the model suitability identification process is performed.

In the above, the embodiment in which the model suitability identification process is performed after performing the hardware suitability identification process has been described, but there is no time-series limitation between the hardware suitability identification process and the model suitability identification process according to the disclosure. Specifically, the electronic device 100 may first input the first model information and the second model information into the model suitability identification module 1200 to identify whether it is suitable to replace the first neural network model with the second neural network model. In addition, if it is identified that it is suitable to replace the first neural network model with the second neural network model, the electronic device 100 may also identify whether it is suitable to execute the second neural network model using hardware of the electronic device 100 by comparing the hardware performance of the electronic device 100 and the hardware performance required to execute the second neural network model.

In the above, it has been described that the personalization level of the first neural network model and the personalization level of the second neural network model are compared only when the service types of the first neural network model included in the first external device 200-1 and the second neural network model included in the electronic device 100 are the same. However, according to another embodiment of the disclosure, when a neural network model having the same service type as the service type of the first neural network model included in the first external device 200-1 does not exist in the electronic device 100, the electronic device 100 may also identify that it is suitable to transfer the first neural network model to the electronic device 100 without identifying the personalization level for the first neural network model.

In the above, the embodiment of additionally performing the model suitability process for each of the one or more neural network models identified as suitable for the hardware of the electronic device 100 after performing the hardware suitability identification process has been described, but the disclosure is limited thereto. That is, according to another embodiment of the disclosure, the electronic device 100 may also receive installation data for a neural network model that satisfies model suitability from the first external device 200-1 by performing only the model suitability identification process without performing the hardware suitability identification process. Hereinafter, an embodiment of receiving installation data from the first external device 200-1 by performing only the model suitability identification process will be described with reference to FIG. 5B. However, in the following description of FIG. 5B, redundant descriptions of the same content as those described above will be omitted.

Referring to FIG. 5B, when a user input is received, the electronic device 100 may transmit a first signal for requesting information related to one or more neural network models included in one or more external devices at operation S205. In addition, as a response to the first signal, the electronic device 100 may receive a second signal including external model information on one or more neural network models included in the first external device 200-1 from the first external device 200-1 among the one or more external devices at operation S215. Hereinafter, within the limit for describing the embodiment as illustrated in FIG. 5B, the term "external model information" is used in the same meaning as the term "first model information" in the description of FIGS. 1 to 5A.

If the second signal including the external model information is received from the first external device 200-1, the electronic device 100 may input internal model information stored in the electronic device and external model information received from the first external device 200-1 into the model suitability identification module 1200 at operation S220 to identify whether each of the one or more neural network models identified as suitable for the hardware of the electronic device 100 is suitable to replace the neural network model included in the electronic device 100. Hereinafter, within the limit for describing the embodiment as illustrated in FIG. 5B, the term "internal model information" is used in the same meaning as the term "second model information" in the description of FIG. 5A.

As described above, the model suitability identification process according to the disclosure may include the model type suitability identification process and the personalization level suitability identification process performed through each of the model type suitability identification module 1210 and the personalization level suitability identification module 1220 as illustrated in FIG. 7.

Specifically, if the service type of the first neural network model among the one or more neural network models included in the first external device 200-1 is the same as the service type of the second neural network model among the plurality of neural network models included in the electronic device 100 (Y in operation S230), the electronic device 100 may compare the personalization level of the first neural network model and the personalization level of the second neural network model based on the information on the personalization levels included in each of the internal model information and the external model information. In addition, if the personalization level of the first neural network model is higher than the personalization level of the second neural network model (Y in operation S240), it may be identified that the first neural network model is suitable to replace the second neural network model at operation S250.

If the model suitability identification process as described above is performed, the electronic device 100 may transmit a third signal including a request for installation data of at least one neural network model identified as suitable for replacing the neural network model included in the electronic device 100 to the first external device 200-1 at operation S260. In addition, as a response to the third signal, the electronic device 100 may receive a fourth signal including the installation data of the one or more identified neural network models from the first external device 200-1 at operation S270.

According to the diverse embodiments as described above with reference to FIGS. 5A to 8, when the neural network model is transferred from the external device, the electronic device 100 may determine whether to transfer the neural network model by identifying whether it is suitable to replace the neural network model included in the electronic device 100 based on the degree of personalization of the neural network model included in the external device, and accordingly, the efficiency and reliability of transfer learning may be further improved.

Figure 9:
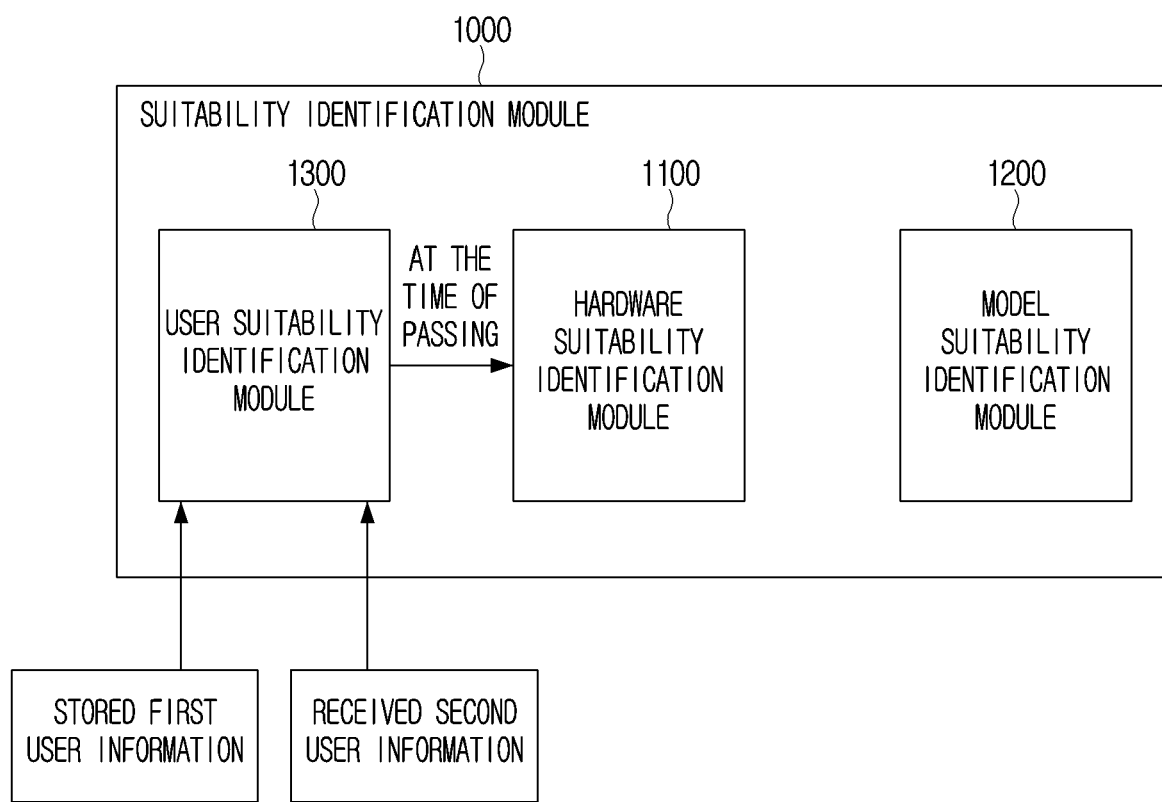
FIG. 9 is a flowchart for describing a controlling method of an electronic device according to an embodiment of the disclosure.

FIG. 9 is a flowchart for describing a controlling method of an electronic device 100 according to an embodiment of the disclosure.

Figure 10:
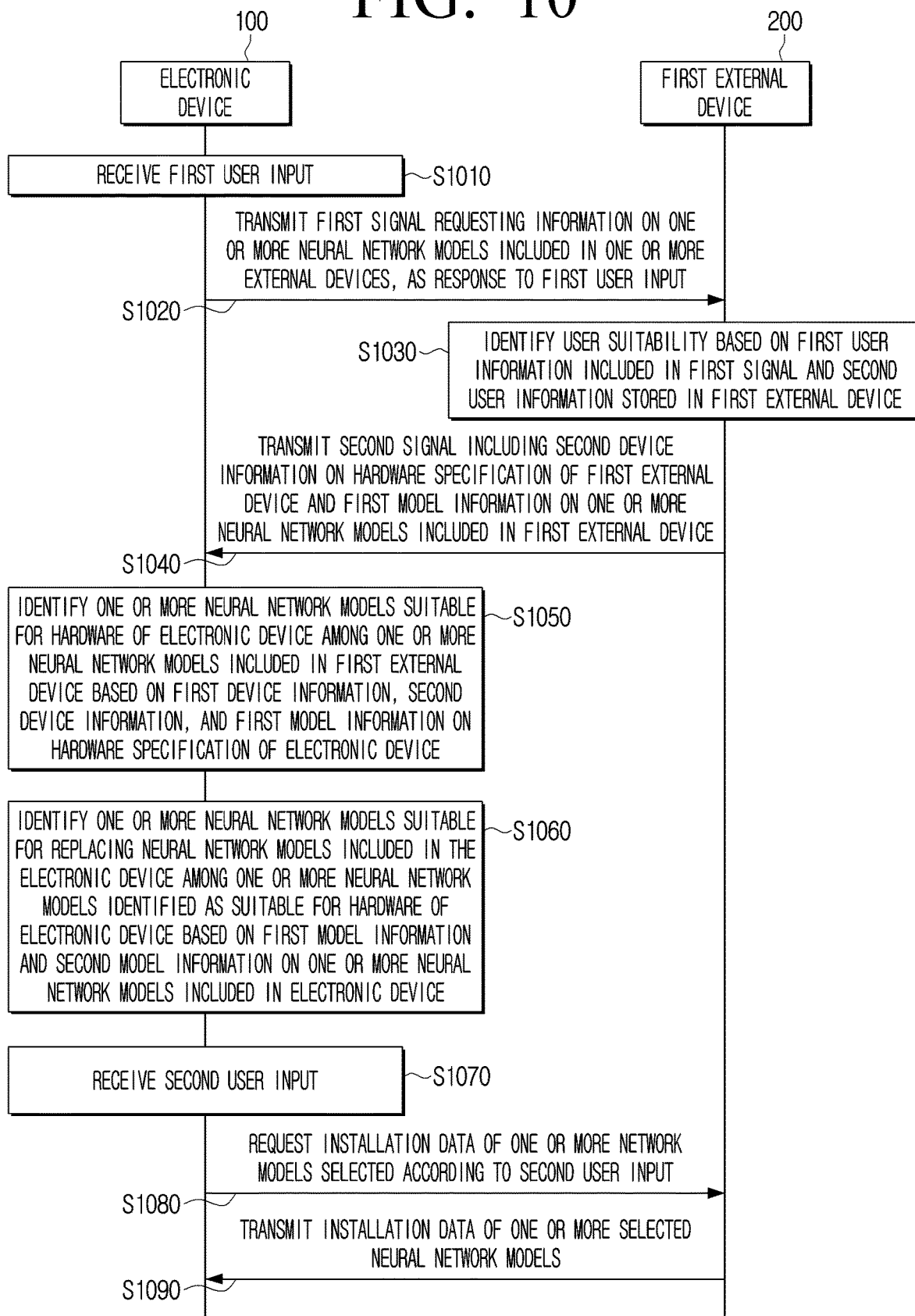
FIG. 10 is a sequence diagram for describing an example of a case in which there are a plurality of external devices according to an embodiment of the disclosure.

FIG. 10 is a sequence diagram for describing an example of a case in which there are a plurality of external devices according to an embodiment of the disclosure.

In the above, the hardware suitability identification process and the model suitability identification process according to the disclosure have been described above, but according to another embodiment of the disclosure, a user suitability identification process may be additionally performed prior to the hardware suitability identification process and the model suitability identification process. The 'user suitability identification process' is a process of identifying whether it is suitable for the user of the electronic device 100 to use the neural network model of the external device, and may be referred to as a 'user authentication process'. In the disclosure, the term 'transition compatibility' may be used as a meaning encompassing hardware suitability, model suitability, and user suitability. Hereinafter, the user suitability identification process will be described in detail with reference to FIGS. 9 and 10.

In the description of FIGS. 1 to 8, it has been described based on the premise that the external device transmits the second signal including the second device information on the hardware specification of the first external device 200-1 and the first model information on the one or more neural network models included in the first external device 200-1 to the electronic device 100 as the response to the first signal, when the electronic device 100 transmits the first signal for requesting the information related to the one or more neural network models included in the first external device 200-1 to the first external device 200-1.

However, before the external device provides the second device information and the first model information to the electronic device 100, the user suitability identification process may be performed by the external device or the user suitability identification process may be performed by the electronic device 100. In the user suitability identification process, because the first user information and the second user information may be used, the first user information may include at least one of account information on the user of the electronic device 100 or identification information on the electronic external device, and the second user information may include at least one of account information on the user of the first external device 200-1 and identification information on the first external device 200-1.

Referring to FIG. 9, the user suitability identification process may be performed by the electronic device 100 according to the disclosure. Specifically, the user suitability identification process may be performed through a user suitability identification module 1300 included in the electronic device 100 as illustrated in FIG. 9.

The 'user suitability identification module 1300' refers to a module that identifies whether it is suitable for the user of the electronic device 100 to use the neural network model included in the first external device 200-1 based on the first user information stored in the electronic device 100 and the second user information received from the first external device 200-1.

Specifically, the first user information may be stored in the electronic device 100. In addition, the electronic device 100 may transmit the first signal for requesting information related to the one or more neural network models included in the first external device 200-1 to the first external device 200-1. If the first signal is received, the first external device 200-1 may transmit the second user information to the electronic device 100. If the second user information is received, the electronic device 100 may perform the user suitability identification process based on the first user information and the second user information.

In particular, if the account information on the user of the electronic device 100 included in the first user information and the account information on the user of the first external device 200-1 included in the second user information match, the electronic device 100 may identify that it is suitable for the user of the electronic device 100 to use the neural network model included in the first external device 200-1. On the other hand, if the account information on the user of the electronic device 100 included in the first user information and the account information on the user of the first external device 200-1 included in the second user information do not match, the electronic device 100 may identify that it is not suitable for the user of the electronic device 100 to use the neural network model included in the first external device 200-1.

In the above, it has been described that the user suitability is satisfied when the account information on the user of the electronic device 100 and the account information on the user of the first external device 200-1 match, but the disclosure is limited thereto. That is, according to an embodiment, when the account for the user of the electronic device 100 has higher authority than the account for the user of the first external device 200-1, and even when the account for the user of the electronic device 100 is included in the same group previously registered as the account for the user of the first external device 200-1, the user suitability according to the disclosure may be satisfied.

According to another embodiment, the external device receiving the first signal may also induce the user authentication by transmitting the second signal including encrypted second device information and encrypted first model information to the electronic device 100, instead of transmitting the second user information to the electronic device 100. Specifically, if a password or biometric information (e.g., fingerprint information, iris information, and the like) for decrypting the encrypted second device information and the encrypted first model information is input, the electronic device 100 may identify that it is suitable for the user of the electronic device 100 to use the neural network model included in the first external device 200-1.

There are no particular restrictions on the encryption and decryption method and an authentication procedure required for decryption.

Referring to FIG. 10, the user suitability identification process may be performed by the first external device 200-1 according to the disclosure. Specifically, the user suitability identification process is not illustrated, but may be performed through the user suitability identification module 1300 included in the first external device 200-1.

Referring to FIG. 10, the electronic device 100 may receive a first user input at operation S1010, and may transmit a first signal for requesting information related to one or more neural network models included in one or more external devices to the first external device 200-1 according to the first user input at operation S1020.

If the first signal is received, the first external device 200-1 may perform a user suitability identification process based on the first user information included in the first signal and the second user information stored in the first external device 200-1 at operation S1030.

Specifically, if the account information on the user of the electronic device 100 included in the first user information and the account information on the user of the first external device 200-1 included in the second user information match, the first external device 200-1 may identify that it is suitable for the user of the electronic device 100 to use the neural network model included in the first external device 200-1. On the other hand, if the account information on the user of the electronic device 100 included in the first user information and the account information on the user of the first external device 200-1 included in the second user information do not match, the first external device 200-1 may identify that it is not suitable for the user of the electronic device 100 to use the neural network model included in the first external device 200-1. If the first user information is not included in the first signal received from the electronic device 100, the first external device 200-1 may receive the first user information by transmitting a request for first user information to the electronic device 100.

If it is identified that it is suitable for the user of the electronic device 100 to use the neural network model included in the first external device 200-1, the first external device 200-1 may transmit the second signal including second device information on a hardware specification of the first external device 200-1 and first model information on one or more neural network models included in the first external device 200-1 to the electronic device 100 at operation S1040. On the other hand, if it is identified that it is not suitable for the user of the electronic device 100 to use the neural network model included in the first external device 200-1, the first external device 200-1 may not transmit the second signal to the electronic device 100. In addition, if the second signal is not received from the first external device 200-1 for a preset time, the electronic device 100 may provide a user notification indicating that a request for information related to the one or more neural network models included in the first external device 200-1 has been rejected.

As a result of performing the user suitability identification process as described above, if it is identified that it is suitable for the user of the electronic device 100 to use the neural network model included in the first external device 200-1, the electronic device 100 may perform the hardware suitability identification process and the model suitability identification process according to the disclosure.

That is, if the second signal is received, the electronic device 100 may identify at least one neural network model suitable for the hardware of the electronic device 100 among the one or more neural network models included in the first external device 200-1 based on the first device information, the second device information, and the first model information on the hardware specification of the electronic device 100 at operation S1050. In addition, the electronic device 100 may identify at least one neural network model suitable for replacing the neural network model included in the electronic device 100 among the one or more neural network models identified as suitable for the hardware of the electronic device 100 based on the first model information and the second model information on the one or more neural network models included in the electronic device 100 at operation S1060. The hardware suitability identification process and the model suitability identification process have been described in detail with reference to FIGS. 1 to 8, and thus, redundant descriptions of specific contents will be omitted.

If the hardware suitability identification process and the model suitability identification process are performed, the electronic device 100 may receive the second user input at operation S1070, and may request installation data of at least one neural network model selected according to the second user input to the first external device 200-1 at operation S1080. In addition, if the installation data of the neural network model is requested, the first external device 200-1 may transmit the installation data of the at least one selected neural network model to the electronic device 100 at operation S1090.

In the above, the embodiment in which the first external device 200-1 performs the user suitability identification process and the electronic device 100 performs the hardware suitability identification process and the model suitability identification process has been described, but the disclosure is not limited thereto. That is, according to another embodiment of the disclosure, the first external device 200-1 may also perform all of the user suitability identification process, the hardware suitability identification process, and the model suitability identification process according to the disclosure.

According to the diverse embodiments as described above with reference to FIGS. 9 and 10, only when it is identified that it is suitable for the user of the electronic device 100 to use the neural network model included in the external device through the user authentication process, it is possible to determine whether to transfer the neural network model, and thus, security and reliability may be improved in the process of transferring the neural network model.

Figure 11:
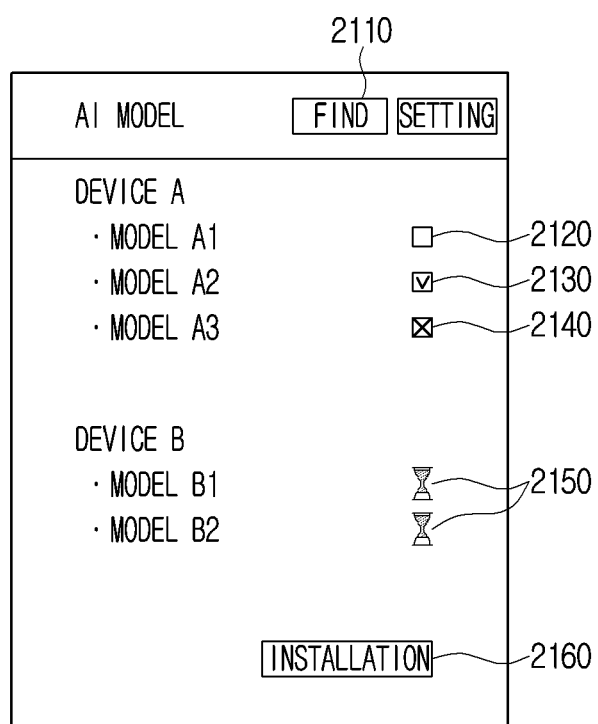
FIG. 11 is a diagram for describing a user interface provided by an electronic device according to an embodiment of the disclosure.

FIG. 11 is a diagram for describing a user interface provided by the electronic device 100 according to an embodiment of the disclosure.

Referring to FIG. 11, the electronic device 100 according to the disclosure may display a user interface (UI) for receiving a user input on a display of the electronic device 100. In addition, the electronic device 100 may receive a user input for searching for one or more neural network models included in one or more first external devices 200-1 through the user interface. For example, the user input for searching at least one neural network model may be received according to a user interaction selecting a 'find' UI element 2110 among a plurality of UI elements included in the user interface.

According to the user input, the electronic device 100 may transmit a first signal for requesting information related to the one or more neural network models included in the one or more first external devices 200-1. As a response to the first signal, the electronic device 100 may receive identification information on the first external device 200-1 and identification information included in each of the first external devices 200-1 from each of the one or more first external devices 200-1. In addition, the electronic device 100 may display the received identification information on the first external device 200-1 and identification information on the neural network model in the user interface. For example, the electronic device 100 may display information indicating that the first external device 200-1 called a device A includes neural network models called a model A1, a model A2, and a model A3, and the first external device 200-1 called a device B includes neural network models called a model B1 and a model B2 in the user interface.

In particular, the electronic device 100 may display, in the user interface, a UI element indicating whether each neural network model is a neural network model that satisfies the transition suitability according to the disclosure, together with the identification information on the first external device 200-1 and the identification information on the neural network model. For example, the electronic device 100 may display UI elements 2120 and 2130 in the form of a 'checkable check box' to indicate that the model A1 and the model A2 included in the device A are neural network models that satisfy the transition suitability. In addition, the electronic device 100 may display a UI element 2140 in the form of a 'uncheckable check box' to indicate that the model A3 included in the device A is a neural network model that does not satisfy the transition suitability. In the case of models B1 and B2 included in the device B, the electronic device 100 may display a UI element 2150 for indicating that the transition suitability identification process according to the disclosure is 'in progress'.

After the UI element indicating whether each neural network model is the neural network model that satisfies the transition suitability according to the disclosure is displayed, the electronic device 100 may receive a user input for selecting one or more neural network models to be installed in the electronic device 100 among the one or more neural network models that satisfy the transition suitability. For example, the user input for selecting the one or more neural network models to be installed in the electronic device 100 may be received according to a user interaction selecting one UI element 2130 among the UI elements 2120 and 2130 displayed on the display. In this case, the electronic device 100 may display the UI element 2130 in the form of a 'checked check box' as illustrated in FIG. 11 to indicate that the model A2 is selected.

After the one or more neural network models to be installed in the electronic device 100 are selected, if a user input for installing the selected one or more neural network models in the electronic device 100 is received, the electronic device 100 may transmit a request for installation data of the one or more selected neural network models to each first external device 200-1 including the one or more selected neural network models. For example, the user input for installing the one or more selected neural network models in the electronic device 100 may be received according to a user interaction selecting an 'installation' UI element 2160 among the plurality of UI elements included in the user interface.

As a response to the request for installation data of the one or more selected neural network models, the electronic device 100 may receive the installation data of the one or more selected neural network models, and install a corresponding neural network model in the electronic device 100 based on the installation data.

In the above, the embodiment in which the electronic device 100 displays the UI element indicating whether the neural network model satisfies the transition suitability has been described. In the disclosure, satisfying the transition suitability means that all of the conditions required for each embodiment among the hardware suitability, model suitability, and user suitability are satisfied, and the transition suitability being not satisfied means that at least some of the conditions required for each embodiment among the hardware suitability, model suitability, and user suitability are not satisfied.

According to the embodiment as described above with reference to FIG. 11, the electronic device 100 may improve user convenience as well as efficiency for the process of transferring the neural network model by requesting and receiving only the installation data of the neural network model selected by the user among the neural network models of the first external device 200-1 that satisfy the transition suitability according to the disclosure.

Figure 12:
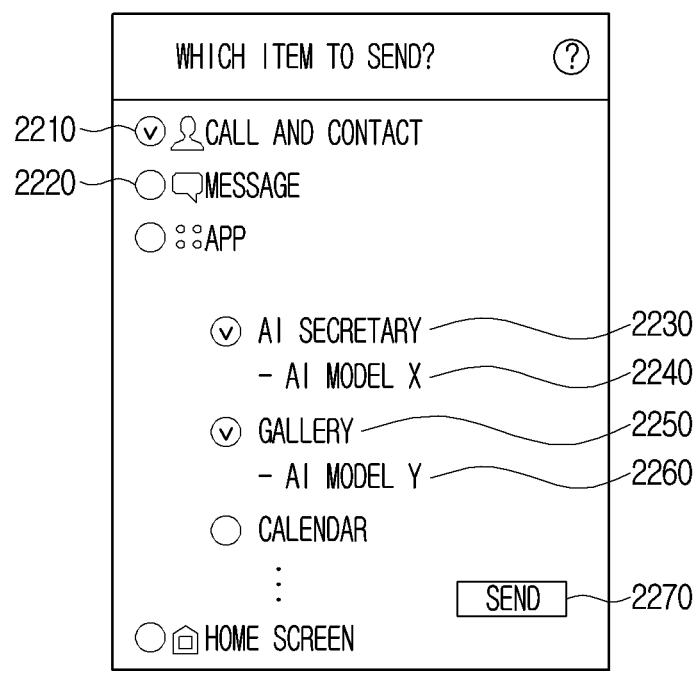
FIG. 12 is a diagram for describing a user interface provided by a first external device according to an embodiment of the disclosure.

FIG. 12 is a diagram for describing a user interface provided by the first external device 200-1 according to an embodiment of the disclosure.

In FIG. 11, the user interface provided by the electronic device 100 has been described, but according to another embodiment, a user interface for receiving a user input according to the disclosure may be displayed on a display of the first external device 200-1. The user interface as illustrated in FIG. 12 represents a user interface for installing one or more applications included in the first external device 200-1 on the electronic device 100.

Referring to FIG. 12, the user interface may include UI elements representing the applications included in the first external device 200-1. For example, as illustrated in FIG. 12, the user interface may include a UI element 2210 representing a 'call and contact' application, a UI element 2220 representing a 'message' application, a UI element 2230 representing an 'AI secretary' application, a UI element representing a 'gallery' application 2250, and the like.

In addition, the user interface may include UI elements representing the neural network models included in each of the applications in the first external device 200-1. Referring again to FIG. 12, the user interface may include a UI element 2240 representing a neural network model called an 'AI model X' included in the 'AI secretary' application, and a UI element 2260 representing a neural network model called an 'AI Model Y' included in the 'gallery' application.

The first external device 200-1 may receive a user input for selecting one or more applications among a plurality of applications included in the first external device 200-1 through the user interface. For example, the first external device 200-1 may receive a user input for selecting the 'call and contact' application, the 'AI secretary' application and the 'gallery' application among the plurality of applications included in the first external device 200-1. In FIG. 12, the UI elements in the form of a 'checked check box' indicate that they are selected applications.

If the user input for selecting the one or more applications is received, the first external device 200-1 may transmit installation data of the one or more selected applications to the electronic device 100. For example, the user input for selecting the one or more applications may be received according to a user interaction for selecting a 'send' element 1270 among the plurality of UI elements included in the user interface.

The first external device 200-1 may transmit the second device information on the hardware specification of the first external device 200-1 and the first model information on the neural network model included in each of the one or more selected application together with the installation data of the one or more selected application to the electronic device 100. In addition, the electronic device 100 may perform the hardware suitability identification process and the model suitability identification process as described above based on the second device information and the first model information received from the first external device 200-1 together with the first device information and the second model information stored in the electronic device 100. Thereafter, if a request for installation data of a neural network model identified as satisfying the hardware suitability and the model suitability is received from the electronic device 100, the first external device 200-1 may transmit the installation data of the identified neural network model to the electronic device 100.

At least some of the installation data of the applications and the installation data of the neural network model may be directly transmitted from the first external device 200-1 to the electronic device 100, and may also be transmitted to the electronic device 100 through a server that provides the installation data of the applications or the installation data of the neural network model.

According to the embodiment as described above with reference to FIG. 12, the installation data of the neural network model may be transmitted from the first external device 200-1 to the electronic device 100 after performing a process of identifying the transition suitability for the neural network model included in the selected application, while transmitting the installation data of the application selected by the user from the first external device 200-1 to the electronic device 100, and thus, user convenience may be further improved. In particular, the embodiment of FIG. 12 may be applied to the case of collectively transmitting at least some of information on the applications and neural network models included in the first external device 200-1, which is an old device, to the electronic device 100, which is a new device, in an initial setup of the electronic device, which is the new device.

Figure 13:
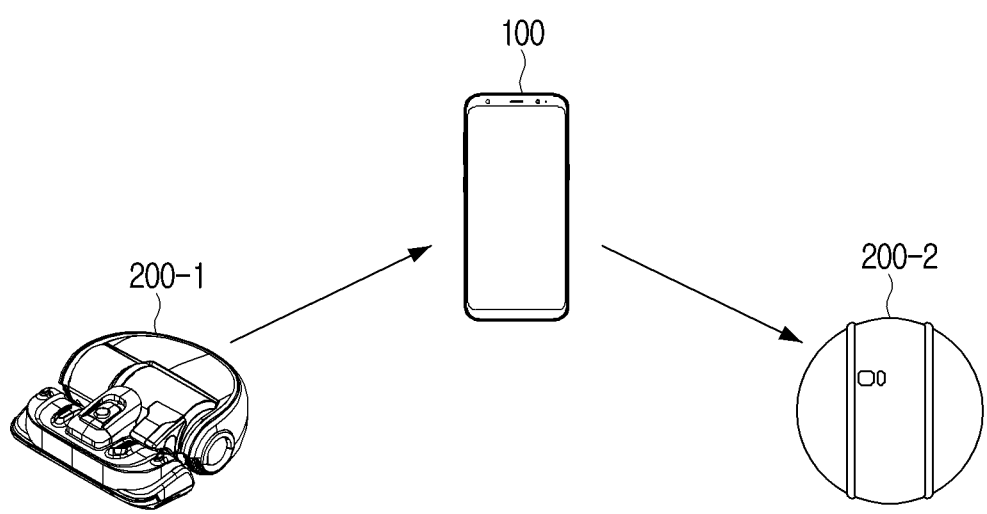
FIG. 13 is a diagram illustrating an example of an electronic device, a first external device, and a second external device according to an embodiment of the disclosure.

FIG. 13 is a diagram illustrating an example of an electronic device, a first external device, and a second external device according to an embodiment of the disclosure.

Figure 14:
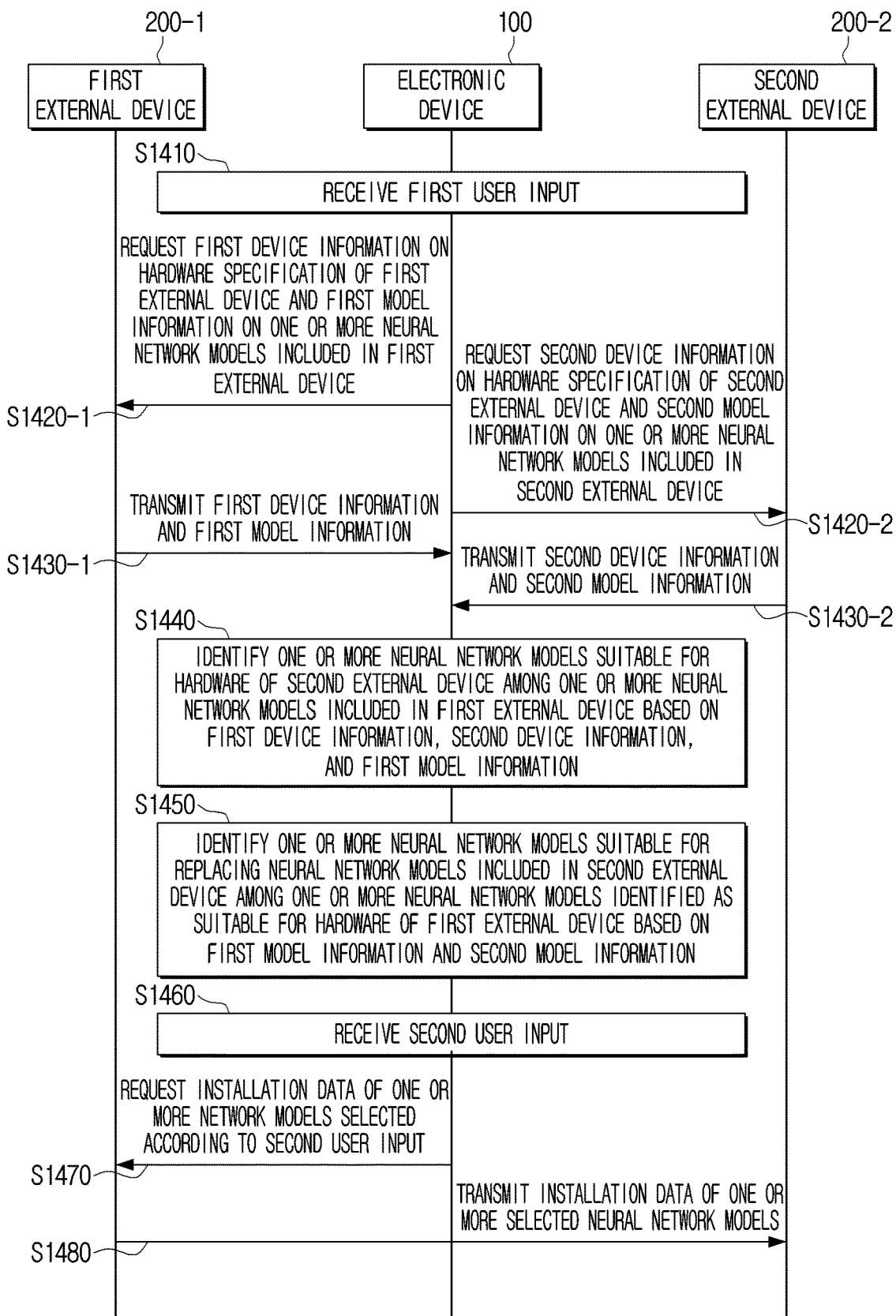
FIG. 14 is a sequence diagram for describing a process of identifying transition suitability by the electronic device when a neural network model included in the first external device is transferred to the second external device according to an embodiment of the disclosure.

FIG. 14 is a sequence diagram for describing a process of identifying transition suitability by an electronic device when a neural network model included in a first external device is transferred to a second external device according to an embodiment of the disclosure.

Referring to FIG. 13, the electronic device 100 according to the disclosure may be implemented as a smartphone, the first external device 200-1 may be implemented as a robot cleaner, and the second external device 200-2 may be implemented as an intelligent companion robot. That is, the types of the electronic device 100, the first external device 200-1, and the second external device 200-2 according to the disclosure may be different from each other. In the disclosure, the term 'first external device 200-1' is used as a term for specifying an external device capable of transmitting installation data of a neural network model to the electronic device 100, while the term 'second external device 200-2' is used as a term for specifying an external device capable of receiving installation data of a neural network model from the first external device 200-1.

On the other hand, when transferring the neural network model included in the first external device 200-1 to the second external device 200-2, because the user interface as described above with reference to FIGS. 11 and 12 may not be displayed when the first external device 200-1 and the second external device 200-2 do not include the display as illustrated in FIG. 13, there is a problem in that it is difficult to receive a user input for performing an embodiment according to the disclosure. In addition, when the first external device 200-1 and the second external device 200-2 do not include the software module according to the disclosure, there is a problem in that the transition suitability identification process according to the disclosure may not be performed through the first external device 200-1 or the second external device 200-2.

Therefore, according to an embodiment of the disclosure, the electronic device 100 may receive a user input, and may perform the hardware suitability identification process and the model suitability identification process based on the information received from the first external device 200-1 and the second external device 200-2.

Referring to FIG. 14, the electronic device 100 may receive a first user input at operation S1410. In addition, the electronic device 100 may transmit a request for the first device information on the hardware specification of the first external device 200-1 and the first model information on one or more neural network models included in the first external device 200-1 to the first external device 200-1 according to the first user input at operation S1420-1, and may transmit a request for the second device information on the hardware specification of the second external device 200-2 and the second model information on one or more neural network models included in the second external device 200-2 to the second external device 200-2 at operation S1420-2.

Unlike the description of FIGS. 1 to 12, in the description of FIGS. 13 and 14, the first device information is used as a term for specifying information on the hardware specification of the first external device 200-1, the second device information is used as a term for specifying information on the hardware specification of the second external device 200-2, the first model information is used as a term for specifying information on the one or more neural network models included in the first external device 200-1, and the second model information is used as a term for specifying information on the one or more neural network models included in the second external device 200-2.

In response to the request received from the electronic device 100, the first external device 200-1 may transmit the first device information and the first model information to the electronic device 100 at operation S1430-1, and the second external device 200-2 may transmit the second device information and the second model information to the electronic device 100 at operation S1430-2.

If the first device information and the first model information are received from the first external device 200-1 and the second device information and the second model information are received from the second external device 200-2, the electronic device 100 may identify one or more neural network models suitable for the hardware of the second external device 200-2 among the one or more neural network models included in the first external device 200-1 based on the first device information, the second device information, and the first model information at operation S1440. Further, the electronic device 100 may identify one or more neural network models suitable for replacing the neural network models included in the second external device 200-2 among the one or more neural network models identified as suitable for the hardware of the first external device 200-1 based on the first model information and the second model information at operation S1450. In the embodiment described with reference to FIGS. 13 and 14, the hardware suitability identification process and the model suitability identification process as described above may be similarly applied.

If the hardware suitability identification process and the model suitability identification process are performed, the electronic device 100 may receive a second user input at operation S1460. In addition, the electronic device 100 may transmit a request for installation data of one or more neural network models selected according to the second user input to the first external device 200-1 at operation S1470. If the request for installation data of the one or more selected neural network model is received, the first external device 200-1 may transmit the installation data of the one or more selected neural network models to the second external device 200-2 at operation S1480. The first external device 200-1 may transmit the installation data of the one or more selected neural network models to the electronic device 100, and the electronic device 100 may also transmit the received installation data to the second external device 200-2.

Figure 15:
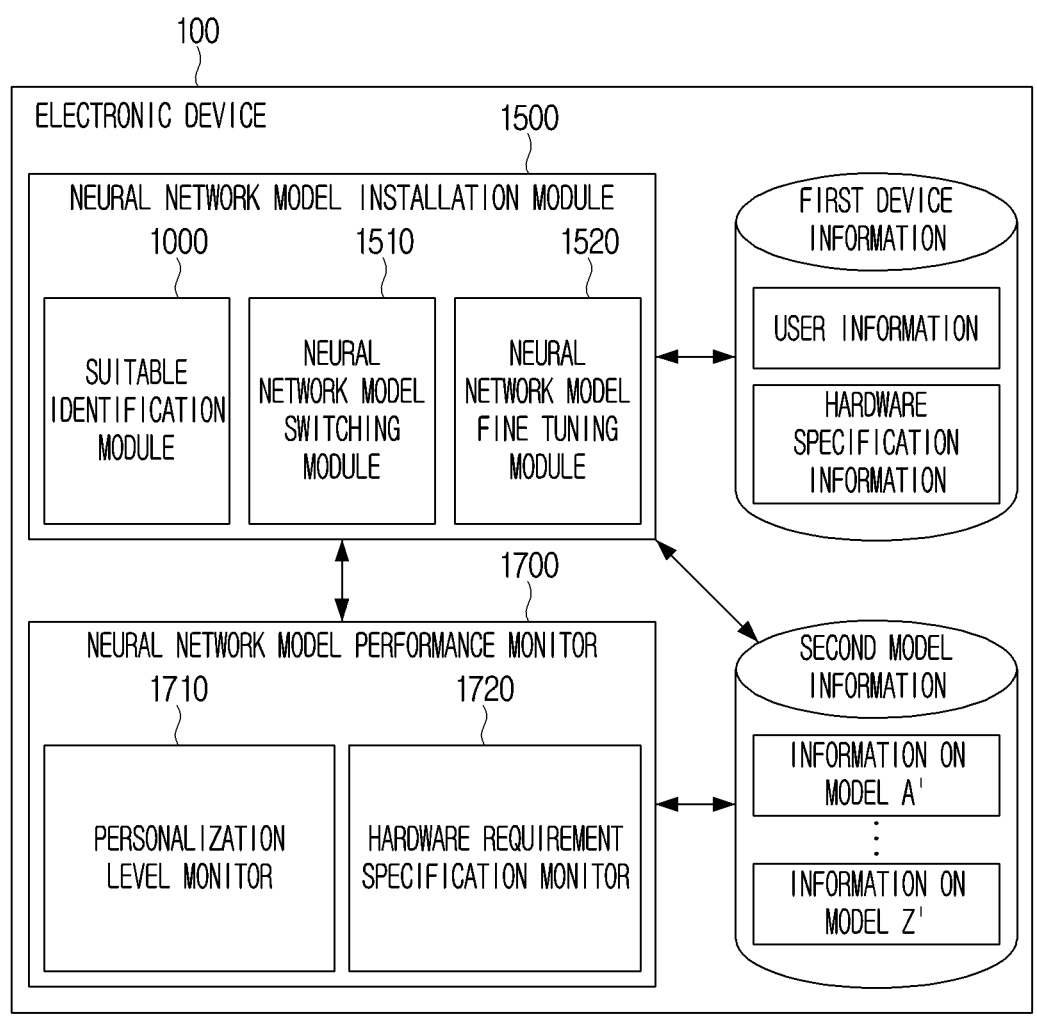
FIG. 15 is a block diagram illustrating in detail an architecture of software modules included in the electronic device according to an embodiment of the disclosure.

According to the embodiment as described above with reference to FIGS. 13 and 14, the electronic device 100 may serve as an intermediary device between the first external device 200-1 and the second external device, thereby improving efficiency and reliability of the process of transferring the neural network model between the external devices that do not include the display or do not include the software modules according to the disclosure FIG. 15 is a block diagram illustrating in detail an architecture of software modules included in the electronic device 100 according to an embodiment of the disclosure.

Referring to FIG. 15, the electronic device 100 according to the disclosure may include software modules such as a neural network model installation module 1500 and a neural network model performance monitor. In addition, the neural network model installation module may include a suitability identification module, a neural network model switching module 1510, and a neural network model fine tuning module 1520, and the neural network model performance monitor 1700 may include a personalization level monitor 1710 and a hardware requirement specification monitor 1720.

The 'suitability identification module' refers to a module of a concept that collectively refers to modules capable of identifying the transition suitability according to the disclosure. Specifically, the suitability identification module may include the hardware suitability identification module 1100, the model suitability identification module 1200, and the user suitability identification module 1300 as described above. In addition, the hardware suitability identification module 1100, the model suitability identification module 1200, and the user suitability identification module 1300 may perform the hardware suitability identification process, the model suitability identification process, and the user suitability identification process according to the diverse embodiments of the disclosure based on the first device information and second model information stored in the electronic device 100 and the second device information and first model information received from an external device. In FIG. 15, the user information is illustrated in a form included in the first device information, but this is only related to an embodiment. The specific operations of the hardware suitability identification module 1100, the model suitability identification module 1200, and the user suitability identification module 1300 have been described above with reference to FIGS. 1 to 14, and thus, the redundant descriptions are omitted.

The 'neural network model switching module' refers to a module that switches the neural network models included in the electronic device 100 into the neural network models included in the external device based on the installation data of the neural network models received from the external device. Specifically, the neural network model switching module may switch the neural network models included in the electronic device 100 into the neural network models included in the external device based on the structure and type of the neural network included in the neural network model included in the installation data, the number of layers included in the neural network, the number of nodes for each layer, a weight value of each node, and a connection relationship between a plurality of nodes.

The 'switching' of the neural network models included in the electronic device 100 into the neural network models included in the external device may include the case of replacing some of the neural network models of the electronic device 100 with some of the neural network models of the external device, such as the case of changing only the weight values of nodes included in the neural network model of the electronic device 100 to the weight values of nodes included in the neural network model of the external device, as well as the case of replacing the entire neural network model of the electronic device 100 with the entire neural network model of the external device.

The 'neural network model fine tuning module' refers to a module that switches the neural network models included in the electronic device 100 into the neural network models included in the external device and then performs fine-tuning on detailed details. Specifically, the neural model fine tuning module may make the neural network models more suitable for the electronic device 100 by tuning the number of nodes for each layer included in the neural network model and the weight value of each node by reflecting detailed differences between the hardware specification of the electronic device 100 and the hardware specification of the external device. In addition, the neural network model fine tuning module may tune parameters related to personalization of the neural network model based on personalization data received from the external device. As described above, the 'personalized data' refers to training data used for personalization of the neural network models included in the external device.

If the neural network models are switched/tuned according to the neural network model switching module and the neural network model fine tuning module, information on the neural network models may be stored/updated as the second model information.

The 'personalization level monitor' refers to a module that monitors the personalization levels of the neural network models included in the electronic device 100. In particular, when the second neural network model included in the external device is installed while the first neural network model included in the electronic device 100 is personalized to some extent, the personalization level monitor may acquire information on the personalization level for the first neural network model and transmit the acquired information to the suitability identification module. In addition, the suitability identification module may identify whether the second neural network model is suitable to replace the first neural network model by comparing information on the personalization level for the first neural network model received from the personalization level monitor and information on the personalization level for the second neural network model received from the external device.

The 'hardware requirement specification monitor' refers to a module that monitors a hardware specification required to execute the neural network models included in the electronic device 100. Specifically, the hardware requirement specification monitor may acquire information on the hardware specification required to execute each of the one or more neural network models included in the electronic device 100, and such information may be stored as information included in the second model information. The 'hardware specification information' included in the first device information is information on a hardware specification at the time of product release of the electronic device 100 or a hardware requirement specification at the time of model suitability determination, and is distinguished from the information on the hardware requirement specification of the neural network models acquired through the hardware requirement specification monitor.

The software modules included in the electronic device 100 have been described above, but this is only an embodiment according to the disclosure, and a new configuration may be added or some modules may be omitted in addition to the illustrated modules. In addition, at least two or more of the software modules according to the disclosure may be implemented as one integrated module.

Figure 16:
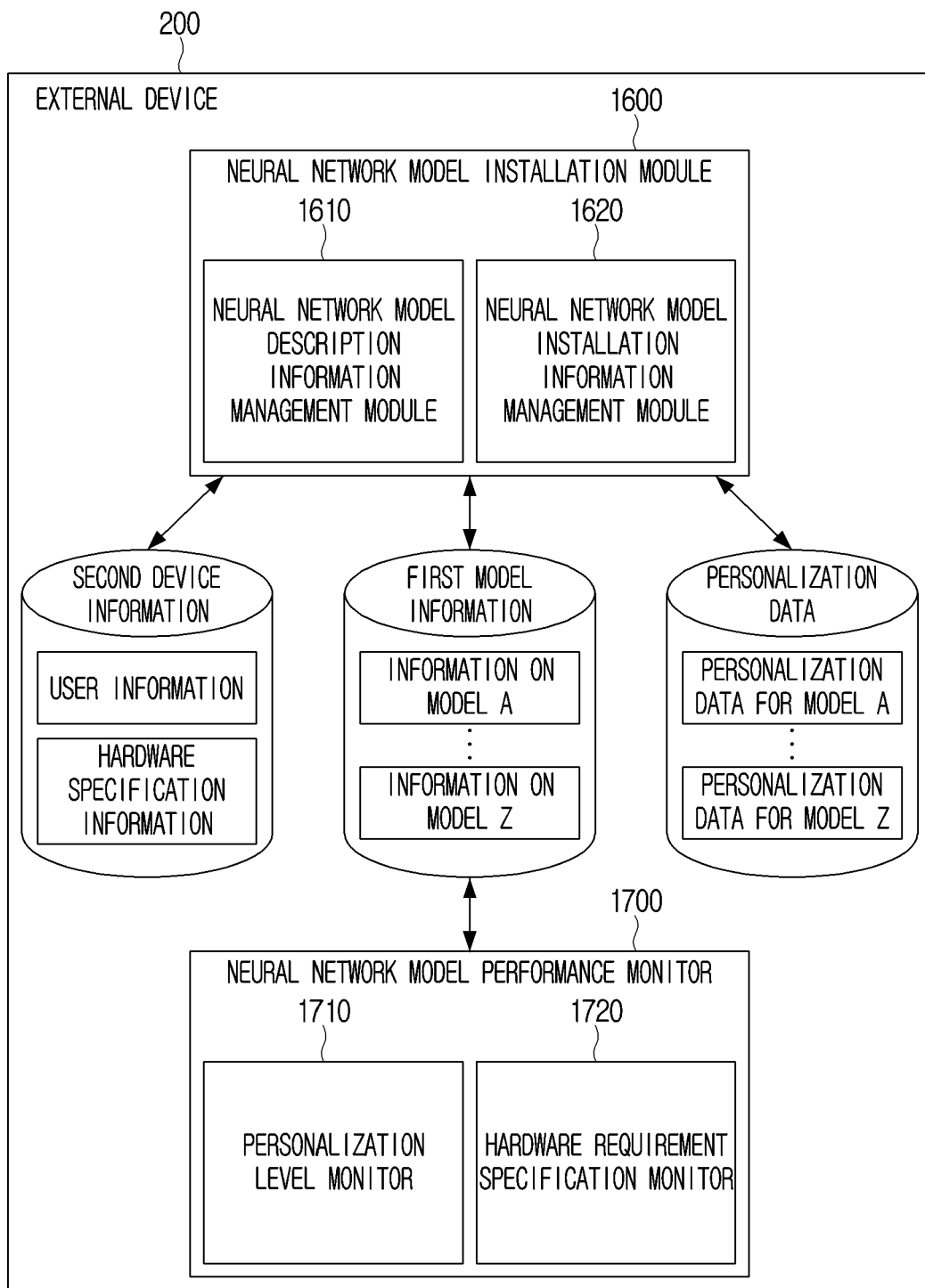
FIG. 16 is a block diagram illustrating in detail an architecture of software modules included in the first external device according to an embodiment of the disclosure.

FIG. 16 is a block diagram illustrating in detail an architecture of software modules included in the first external device 200-1 according to an embodiment of the disclosure.

Referring to FIG. 16, the first external device 200-1 may include software modules such as a neural network model installation module 1600 and a neural network model performance monitor 1700. In addition, the neural network model installation module 1600 may include a neural network model description information management module 1610 and a neural network model installation information management module 1620, and the neural network model performance monitor may include a personalization level monitor 1710 and a hardware requirement specification monitor 1720.

The 'neural network model description information management module 1610' refers to a module that comprehensively manages information necessary for determining transition suitability for the neural network models included in the first external device 200-1. Specifically, the neural network model description information management module 1610 may transmit the second device information and the first model information to the electronic device 100.

As described above, the second device information is information on the hardware specification of the first external device 200-1, and specifically refers to a term for generically referring to information on specifications indicating what kind of performance each hardware included in the first external device 200-1 has. In addition, the first model information is information on the one or more neural network models included in the first external device 200-1, and may specifically include information on a service type, information on a personalization level, and information on a hardware requirement specification of each of the one or more neural network models included in the first external device 200-1.

In addition, the neural network model description information management module 1610 may collectively manage various information such as identification information, performance and version information for each of the neural network models included in the first external device 200-1.

The 'neural network model installation information management module 1620' refers to a module that manages installation data of the neural network models. Specifically, the neural network model installation information management module 1620 may transmit the installation data of the one or more neural network models to the electronic device 100 in response to the request for installation data received from the electronic device 100. In particular, the installation data may include identification information for each of the one or more neural network models and configuration information necessary to install the one or more identified neural network models. The 'configuration information' may include the structure and type of the neural networks included in the neural network model, the number of layers included in the neural network, the number of nodes for each layer, a weight value of each node, and a connection relationship between a plurality of nodes.

In addition, the neural network model installation information management module 1620 may transmit personalization data for the one or more neural network models to the electronic device 100 together with the installation data of the one or more neural network models.

The 'personalization level monitor 1710' refers to a module that monitors the personalization levels of the neural network models included in the first external device 200-1. In particular, the personalization level monitor 1710 may output information on the personalization levels of the neural network models included in the first external device 200-1 based on information on the user's history and information on the user's feedback. It has been described above that the Information on the user's history may include the information on the number of times, frequency, and duration of use of the neural network models by the user, and the information on the user's feedback may include the direct evaluation information input for the use result after the user uses the neural network model and the indirect evaluation information related to the use result.

The 'hardware requirement specification monitor 1720' refers to a module that monitors a hardware specification required to execute the neural network models included in the first external device 200-1. Specifically, the hardware requirement specification monitor 1720 may acquire information on the hardware specification required to execute each of the one or more neural network models included in the first external device 200-1, and such information may be stored as information included in the first model information.

The software modules included in the first external device 200-1 have been described above, but this is only an embodiment according to the disclosure, and a new configuration may be added or some modules may be omitted in addition to the illustrated modules. In addition, at least two or more neural network models among the software modules according to the disclosure may be implemented as an integrated neural network model.

Figure 17:
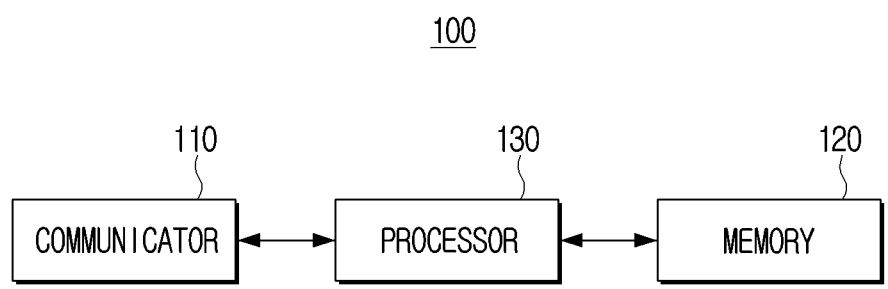
FIG. 17 is a block diagram schematically illustrating an architecture of hardware configurations included in the electronic device according to an embodiment of the disclosure.

FIG. 17 is a block diagram schematically illustrating an architecture of hardware configurations included in the electronic device according to an embodiment of the disclosure.

Figure 18:
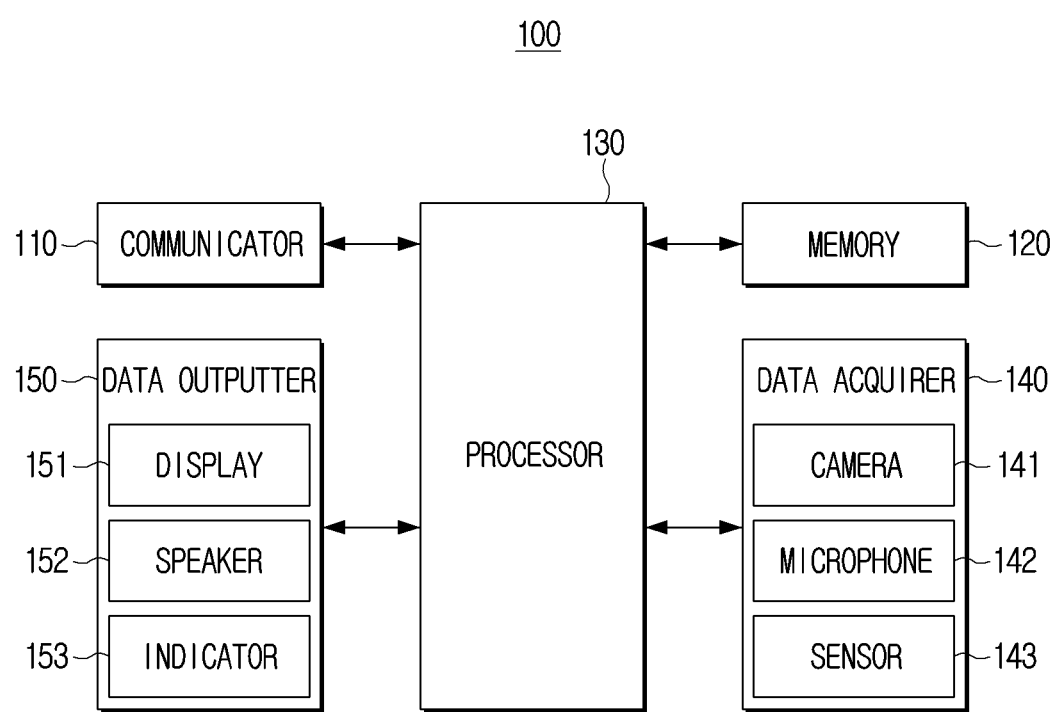
FIG. 18 is a block diagram illustrating in more detail the architecture of the hardware configurations included in the electronic device according to an embodiment of the disclosure.

FIG. 18 is a block diagram illustrating in more detail the architecture of the hardware configurations included in an electronic device according to an embodiment of the disclosure.

Referring to FIG. 17, the electronic device 100 according to an embodiment of the disclosure includes a communicator 110, a memory 120, and a processor 130. In addition, as illustrated in FIG. 18, the electronic device 100 according to an embodiment of the disclosure may further include a data acquirer 140 and a data outputter 150. However, the configurations as illustrated in FIGS. 17 and 18 are merely examples, and in implementing the disclosure, a new configuration may be added or some configurations may be omitted in addition to the configurations as illustrated in FIGS. 17 and 18.

The communicator 110 may include a circuit and communicate with an external device. Specifically, the processor 130 may receive a variety of data or information from the external device connected through the communicator 110, and may also transmit a variety of data or information to the external device.

The communicator 110 may include at least one of wireless-fidelity (Wi-Fi) module, a Bluetooth module, a wireless communication module, or a near-field communication (NFC) module. Specifically, each of the Wi-Fi module and the Bluetooth module may perform communication in a Wi-Fi manner and a Bluetooth manner. In the case of using the Wi-Fi module or the Bluetooth module, various kinds of connection information such as a service set identifier (SSID) are first transmitted and received, communication is connected using the connection information, and various kinds of information may then be transmitted and received.

In addition, a wireless communication module may perform communication according to various communication protocols such as Institute of Electrical and Electronics Engineers (IEEE), Zigbee, 3rd generation (3G), 3rd generation partnership project (3GPP), long term evolution (LTE), 5th generation (5G), and the like. In addition, the NFC module may perform communication in the NFC manner using a band of 13.56 MHz among various radio frequency identification (RF-ID) frequency bands such as 135 kHz, 13.56 MHz, 433 MHZ, 860 to 960 MHz, and 2.45 GHz.

In particular, in diverse embodiments according to the disclosure, the communicator 110 may transmit a first signal for requesting information related to the one or more neural network models included in the first external device 200-1 and a third signal including a request for installation data of the one or more neural network models to the first external device 200-1. In addition, the communicator 110 may receive the second signal including the second device information on the hardware specification of the first external device 200-1 and the first model information on the one or more neural network models included in the first external device 200-1 from the first external device 200-1 as the response to the first signal, and receives the fourth signal including the installation data of the one or more identified neural network models as the response to the third signal.

One or more instructions regarding the electronic device 100 may be stored in the memory 120. In addition, the memory 120 may store an operating system (O/S) for driving the electronic device 100. In addition, the memory 120 may also store various software programs or applications for operating the electronic device 100 according to diverse embodiments of the disclosure. In addition, the memory 120 may include a semiconductor memory such as a flash memory and the like, or a magnetic storage medium such as a hard disk and the like.

Specifically, the memory 120 may store various software modules for operating the electronic device 100 according to diverse embodiments of the disclosure, and the processor 130 may execute the various software modules stored in the memory 120 to control an operation of the electronic device 100. That is, the memory 120 is accessed by the processor 130, and readout, writing, correction, deletion, update, and the like of data in the memory 120 may be performed by the processor 130.

On the other hand, in the disclosure, a term memory 120 may be used as a meaning including a memory 120, a read only memory (ROM) (not illustrated) in the processor 130, a random access memory (RAM) (not illustrated), or a memory card (not illustrated) (e.g., a micro secure digital (SD) card or a memory stick) mounted in the electronic device 100.

In particular, in diverse embodiments according to the disclosure, the memory 120 may store the first device information on the hardware specification of the electronic device 100 and the second model information on the one or more neural network models included in the electronic device 100. In addition, the memory 120 may store various modules as described above with reference to FIG. 15, including the hardware suitability identification module 1100, the model suitability identification module 1200, and the user suitability identification module 1300. In addition, various information necessary within the scope for achieving the purpose of the disclosure may be stored in the memory 120, and the information stored in the memory 120 may also be updated as being received from the external device or being input by the user.

The processor 130 controls an overall operation of the electronic device 100. Specifically, the processor 130 may be connected to the configurations of the electronic device 100 including the communicator 110 and the memory 120 as described above, and may execute one or more instructions stored in the memory 120 as described above to control the overall operation of the electronic device 100.

The processor 130 may be implemented in various manners. For example, the processor 130 may be implemented as at least one of an application specific integrated circuit (ASIC), an embedded processor, a microprocessor, a hardware control logic, a hardware finite state machine (FSM), or a digital signal processor (DSP). On the other hand, in the disclosure, the term processor 130 may be used as a meaning including a central processing unit (CPU), a graphic processing unit (GPU), a main processing unit (MPU), and the like.

In particular, in diverse embodiments according to the disclosure, the processor 130 may control the communicator 110 to transmit a first signal for requesting information related to one or more neural network models included in one or more external devices when a user input is received, may receive a second signal including second device information on a hardware specification of a first external device 200-1 and first model information on one or more neural network models included in the first external device 200-1 from the first external device 200-1 among the one or more external devices through the communicator 110 as a response to the first signal, may identify whether each of the one or more neural network models included in the first external device 200-1 is suitable for hardware of the electronic device 100 by inputting the first device information, the second device information, and the first model information into a hardware suitability identification module 1100, may control the communicator 110 to transmit a third signal including a request for installation data of one or more neural network models identified as suitable for the hardware of the electronic device 100 to the first external device 200-1, and may receive a fourth signal including the installation data of the one or more neural network models identified as suitable for the hardware of the electronic device 100 from the first external device 200-1 through the communicator 110 as a response to the third signal.

In addition, if the one or more neural network models suitable for the hardware of the electronic device 100 are identified, the processor 130 may also identify whether each of the one or more neural network models identified as suitable for the hardware of the electronic device 100 is suitable to replace the neural network models included in the electronic device 100 by inputting the first model information and the second model information into the model suitability identification module 1200. The diverse embodiments according to the disclosure based on the control of the processor 130 have been described above with reference to FIGS. 1 to 16, and thus redundant descriptions will be omitted.

The data acquirer 140 may include a circuit, and the processor 130 may acquire various types of data used in the electronic device 100 through the data acquirer 140. Specifically, the data acquirer 140 may include a camera 141, a microphone 142, a sensor 143, and the like.

The camera 141 may acquire an image of at least one object. Specifically, the camera 141 may include an image sensor, and the image sensor may convert light entering through a lens into an electrical image signal. In addition, the microphone 142 may receive a voice signal and convert the received voice signal into an electrical signal.

The sensor 143 may detect various information inside and outside the electronic device 100. Specifically, the sensor 143 may include at least one of a global positioning system (GPS) sensor, a gyro sensor, an acceleration sensor (accelerometer), a lidar sensor, an inertial sensor (inertial measurement unit (IMU)), or a motion sensor. In addition, the sensor 143 may include various types of sensors such as a temperature sensor, a humidity sensor, an infrared sensor, and a bio sensor.

In particular, in the diverse embodiments according to the disclosure, the data acquirer 140 may acquire data input to the one or more neural network models included in the electronic device 100. For example, the processor 130 may acquire image data input to a neural network model related to object recognition through the camera 141, and may acquire a voice signal input to a neural network model related to voice recognition through the microphone 142. In addition, the processor 130 may also acquire location information input to a neural network model related to autonomous driving through at least one sensor 143 of the GPS sensor or the lidar sensor.

The data outputter 150 may include a circuit, and the processor 130 may output various functions that may be performed by the electronic device 100 through the data outputter 150. Specifically, the data outputter 150 may include at least one of a display 151, a speaker 152, or an indicator 153.

The display 151 may output image data. Specifically, the display 151 may display an image or a user interface stored in the memory 120 under the control of the processor 130. The display 151 may be implemented as a liquid crystal display (LCD) panel, an organic light emitting diode (OLED) and the like, and may also be implemented as a flexible display, a transparent display, and the like in some cases. However, the display 151 according to the disclosure is not limited to a particular kind. The display 151 may be implemented in the form of a touch display and configured to receive a user's touch interaction. The speaker 152 may output audio data under the control of the processor 130, and the indicator 153 may be lit under the control of the processor 130.

In particular, in the diverse embodiments according to the disclosure, the display 151 may display a user interface including information on a neural network model that satisfies the hardware suitability and the model suitability according to the disclosure. In addition, the processor 130 may receive a user input for selecting one or more neural network models among the one or more neural network models through the user interface.

If it is identified that there is no neural network model that satisfies the hardware suitability and the model suitability among the neural network models included in the external device, the processor 130 may also output a user notification to indicate that all neural network models included in the external device do not satisfy the transition suitability according to the disclosure. The user notification may be output in the form of visual information through the display 151, and may be output in the form of audio information through the speaker 152 or in a manner in which the indicator 153 is lit.

On the other hand, the controlling method of the electronic device 100 according to the embodiment described above may be implemented by a program and provided to the electronic device 100. In particular, the program including the controlling method of the electronic device 100 may be stored in a non-transitory computer readable medium and provided.

Specifically, in a non-transitory computer readable recording medium including a program for executing a controlling method of the electronic device 100, the controlling method of the electronic device 100 may include transmitting a first signal for requesting information related to one or more neural network models included in one or more external devices when a user input is received, receiving a second signal including second device information on a hardware specification of a first external device 200-1 and first model information on one or more neural network models included in the first external device 200-1 from the first external device 200-1 among the one or more external devices through the communicator 110 as a response to the first signal, identifying whether each of the one or more neural network models included in the first external device 200-1 is suitable for hardware of the electronic device 100 by inputting the first device information, the second device information, and the first model information into a hardware suitability identification module 1100, transmitting a third signal including a request for installation data of one or more neural network models identified as suitable for the hardware of the electronic device 100 to the first external device 200-1, and receiving a fourth signal including the installation data of the one or more neural network models identified as suitable for the hardware of the electronic device 100 from the first external device 200-1 through the communicator 110 as a response to the third signal.

In addition, the identifying of whether each of the one or more neural network models included in the first external device 200-1 is suitable for hardware of the electronic device 100 may include identifying the one or more neural network models included in the first external device 200-1 as suitable for the hardware of the electronic device 100 when the specification of each of the plurality of hardware configurations included in the electronic device 100 is greater than or equal to the specifications of a plurality of hardware configurations included in the first external device 200-1, and identifying one or more neural network models having a hardware requirement specification lower than the specifications of the plurality of hardware configurations included in the electronic device 100 among the one or more neural network models included in the first external device 200-1 as suitable for the hardware of the electronic device 100 when specifications of one or more of the plurality of hardware configurations included in the electronic device 100 are less than the specifications of the plurality of hardware configurations included in the first external device 200-1.

The non-transitory computer readable medium is not a medium that stores data for a short time such as a register, a cache, a memory 120, and the like, but means a machine readable medium that semi-permanently stores data. Specifically, various applications or programs described above may be stored and provided in the non-transitory computer readable medium such as a compact disk (CD), a digital versatile disk (DVD), a hard disk, a Blu-ray disk, a universal serial bus (USB), a memory 120 card, a read only memory (ROM), and the like.

In the above, the controlling method of the electronic device 100 and the computer readable recording medium including the program that executes the controlling method of the electronic device 100 have been briefly described, but this is merely to omit the redundant descriptions, and the diverse embodiments of the electronic device 100 may also be applied to the controlling method of the electronic device 100 and the computer readable recording medium including the program that executes the controlling method of the electronic device 100.

According to the diverse embodiments as described above, when the neural network model is transferred from the external device, the electronic device 100 may determine whether to transfer the neural network model by identifying whether it is suitable to transfer the neural network model to the electronic device 100, and accordingly, the efficiency and reliability of transfer learning may be significantly improved.

The functions related to the neural network models as described above may be performed through the memory 120 and the processor 130. The processor 130 may be configured as one or a plurality of processors 130. At this time, one or the plurality of processors 130 may be a general-purpose processor 130 such as a CPU, an AP, and the like, a graphic-dedicated processor 130 such as a GPU, a VPU, and the like, or an artificial intelligence dedicated process such as an NPU. One or the plurality of processors 130 perform a control to process input data according to predefined operating rules or artificial intelligence models stored in a non-volatile memory 120 and a volatile memory 120. The predefined operating rules or artificial intelligence models are characterized by being created through training.

Here, "created through training" refers to the predefined operating rules or artificial intelligence models of desired characteristics created by applying learning algorithms to a large number of learning data. Such learning may be performed in a device itself in which the artificial intelligence according to the disclosure is performed, or may also be performed through a separate server/system.

The artificial intelligence model may include a plurality of neural network layers. Each layer has a plurality of weight values and a layer calculation is performed by calculating a calculation result of a previous layer and the plurality of weight values. Examples of the neural network include a convolutional neural network (CNN), a deep neural network (DNN), a recurrent neural network (RNN), a restricted boltzmann machine (RBM), a deep belief network (DBN), a bidirectional recurrent deep neural network (BRDNN), generative adversarial networks (GAN), and deep Q-networks, and the neural network in the disclosure is not limited to the examples described above except as otherwise specified.

The learning algorithm is a method of training a predetermined target device (e.g., a robot) using a large number of learning data so that the predetermined target device may make a decision or predict itself. Examples of the learning algorithm include supervised learning, unsupervised learning, semi-supervised learning, or reinforcement learning, and the learning algorithm in the disclosure is not limited to the examples described above except for the case in which it is specified.

The machine-readable storage medium may be provided in the form of non-transitory storage medium. The term "non-transitory" simply means that the storage medium is a tangible device and does not contain signals (e.g., electromagnetic waves), and such a term does not distinguish between a case where data is stored semi-permanently in the storage medium and a case where data is temporarily stored in the storage medium. For example, the 'non-transitory storage medium' may include a buffer in which the data is temporarily stored.

According to an embodiment, the method according to the diverse embodiments disclosed in the disclosure may be included and provided in a computer program product. The computer program product may be traded as a product between a seller and a purchaser. The computer program product may be distributed in the form of a machine-readable storage medium (e.g., compact disc read only memory (CD-ROM)), or may be distributed (e.g., downloaded or uploaded) online, through an application store (e.g., Play Store™) or directly between two user devices (e.g., smartphones). In the case of the online distribution, at least a portion of the computer program product (e.g., a downloadable app) may be at least temporarily stored in a machine readable storage medium such as a memory of a server of a manufacturer, a server of an application store, or a relay server, or may be temporarily generated.

Each of the components (e.g., modules or programs) according to the diverse embodiments as described above may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration.

The operations performed by the module, the program, or other component according to the diverse embodiments may be performed in a sequential, parallel, iterative, or heuristic manner, or at least some operations may be executed in a different order or omitted, or other operations may be added.

On the other hand, the term "~ or" or "module" used in the disclosure includes a unit composed of hardware, software, or firmware, and may be used interchangeably with the term such as logic, logic block, component, or circuit. The "~ or" or "module" may be an integrally formed component or a minimum unit of performing one or more functions or a portion thereof. For example, the module may be configured as an application-specific integrated circuit (ASIC).

The diverse embodiments of the disclosure may be implemented by software including instructions that are stored in machine (e.g., a computer)-readable storage media. The machine is a device that invokes the stored instructions from the storage medium and is operable according to the called instruction, and may include the electronic device (e.g., the electronic device 100) according to the disclosed embodiments.

When the instructions are executed by the processor 130, the processor 130 may perform functions corresponding to the instructions, either directly or using other components under the control of the processor 130. The instructions may include codes generated or executed by a compiler or an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communicator;
memory storing first device information on a hardware specification of the electronic device and one or more computer programs; and
one or more processors communicatively coupled to the communicator and the memory,
wherein the one or more computer programs include computer-executable instructions that, when executed by the one or more processors individually or collectively, cause the electronic device to:
control the communicator to transmit a first signal for requesting information related to one or more neural network models included in one or more external devices, based on a user input being received,
receive a second signal comprising second device information on a hardware specification of a first external device and first model information on one or more neural network models included in the first external device from the first external device among the one or more external devices through the communicator, as a response to the first signal,
identify whether each of the one or more neural network models included in the first external device is suitable for hardware of the electronic device based on the first device information, the second device information, and the first model information, and
perform an installation for one or more neural network models identified as suitable for the hardware of the electronic device.

2. The electronic device as claimed in claim 1, wherein the one or more computer programs further include computer-executable instructions that, when executed by the one or more processors individually or collectively, cause the electronic device to:
identify whether each of the one or more neural network models included in the first external device is suitable for the hardware of the electronic device by inputting the first device information, the second device information, and the first model information into a hardware suitability identifier,
based on identifying whether each of the one or more neural network models included in the first external device is suitable for the hardware of the electronic device:
control the communicator to transmit a third signal comprising a request for installation data of one or more neural network models identified as suitable for the hardware of the electronic device to the first external device,
receive a fourth signal comprising the installation data of the one or more neural network models identified as suitable for the hardware of the electronic device from the first external device through the communicator, as a response to the third signal, and
perform the installation for the one or more neural network models identified as suitable for the hardware of the electronic device based on the installation data.

3. The electronic device as claimed in claim 2, wherein the one or more computer programs further include computer-executable instructions that, when executed by the one or more processors individually or collectively, cause the electronic device to:
identify the one or more neural network models included in the first external device as suitable for the hardware of the electronic device, based on a specification of each of a plurality of hardware configurations included in the electronic device being greater than or equal to specifications of a plurality of hardware configurations included in the first external device, and
identify one or more neural network models having a hardware requirement specification lower than the specifications of the plurality of hardware configurations included in the electronic device among the one or more neural network models included in the first external device as suitable for the hardware of the electronic device, based on specifications of one or more of the plurality of hardware configurations included in the electronic device being less than the specifications of the plurality of hardware configurations included in the first external device.

4. The electronic device as claimed in claim 3,
wherein the first device information comprises information on a specification of the one or more processors, a specification of the memory, and a specification of a data acquirer included in the electronic device,
wherein the data acquirer included in the electronic device acquires data input to the one or more neural network models included in the electronic device, and comprises at least one of a camera, a microphone, or a sensor included in the electronic device,
wherein the second device information comprises information on a specification of a processor included in the first external device, a specification of a memory included in the first external device, and a specification of a data acquirer included in the first external device,
wherein the data acquirer included in the first external device acquires data input to the one or more neural network models included in the first external device, and includes at least one of a camera, a microphone, or a sensor included in the first external device, and
wherein the first model information comprises information on a hardware requirement specification of each of the one or more neural network models included in the first external device.

5. The electronic device as claimed in claim 4,
wherein the memory stores second model information on the one or more neural network models included in the electronic device and a model suitability identifier for identifying a neural network model suitable for replacing the one or more neural network models included in the electronic device,
wherein the is one or more computer programs further include computer-executable instructions that, when executed by the one or more processors individually or collectively, cause the electronic device to identify whether each of the one or more neural network models identified as suitable for the hardware of the electronic device is suitable for replacing the one or more neural network models included in the electronic device by inputting the first model information and the second model information into the model suitability identifier, based on the one or more neural network models suitable for the hardware of the electronic device being identified, wherein the third signal comprises a request for installation data of the one or more neural network models identified as suitable for replacing the one or more neural network models included in the electronic device, and wherein the fourth signal comprises the installation data of the one or more neural network models identified as suitable for replacing the one or more neural network models included in the electronic device.

6. The electronic device as claimed in claim 5, wherein the first model information further comprises information on a service type and information on a personalization level of each of the one or more neural network models included in the first external device, and wherein the second model information further comprises information on a service type and information on a personalization level of each of the one or more neural network models included in the electronic device.

7. The electronic device as claimed in claim 6, wherein the one or more computer programs further include computer-executable instructions that, when executed by the one or more processors individually or collectively, cause the electronic device to:

compare service types of the one or more neural network models included in the electronic device with service types of the one or more neural network models identified as suitable for the hardware of the electronic device, based on the information on the service type included in each of the first model information and the second model information, compare a personalization level of a first neural network model and a personalization level of a second neural network model based on the information on the personalization level included in each of the first model information and the second model information, based on the service type of the first neural network model among the one or more neural network models identified as suitable for the hardware of the electronic device being the same as the service type of the second neural network model among the one or more neural network models included in the electronic device, and identify the first neural network model as suitable for replacing the second neural network model, based on the personalization level of the first neural network model being higher than the personalization level of the second neural network model.

8. The electronic device as claimed in claim 7, wherein the personalization level of the first neural network model is identified based on at least one of information on a user's usage history of the first external device for the first neural network model and information on a user's feedback of the first external device for the first neural network model, and wherein the personalization level of the second neural network model is identified based on at least one of information on a user's usage history of the electronic device for the second neural network model and information on a user's feedback of the electronic device for the second neural network model.

9. The electronic device as claimed in claim 3, wherein the second signal is received from the first external device through the communicator as user authentication is completed based on first user information on the electronic device and second user information on the first external device, wherein the first user information comprises at least one of account information on a user of the electronic device or identification information on the electronic device, and wherein the second user information comprises at least one of account information for a user of the first external device or identification information for the first external device.

10. The electronic device as claimed in claim 3, further comprising a display, wherein the is one or more computer programs further include computer-executable instructions that, when executed by the one or more processors individually or collectively, cause the electronic device to:

control the display to display a user interface including information on the one or more neural network models identified as suitable for the hardware of the electronic device, and receive a user input for selecting one or more neural network models among the one or more neural network models identified as suitable for the hardware of the electronic device through the user interface, wherein the third signal comprises a request for installation data of the one or more selected neural network models, and wherein the fourth signal comprises installation data of the one or more selected neural network models.

11. A controlling method performed by an electronic device that stores first device information on a hardware specification of the electronic device, the controlling method comprising:

transmitting, by the electronic device, a first signal for requesting information related to one or more neural network models included in one or more external devices, based on a user input being received;

receiving, by the electronic device, a second signal comprising second device information on a hardware specification of a first external device and first model information on one or more neural network models included in the first external device from the first external device among the one or more external devices, as a response to the first signal;

identifying, by the electronic device, whether each of the one or more neural network models included in the first external device is suitable for the hardware of the electronic device based on the first device information, the second device information, and the first model information; and performing, by the electronic device, an installation for one or more neural network models identified as suitable for the hardware of the electronic device.

12. The controlling method as claimed in claim 11, wherein the identifying comprises identifying whether each of the one or more neural network models included in the first external device is suitable for the hardware of the electronic device by inputting the first device information, the second device information, and the first model information into a hardware suitability identifier, and wherein the performing comprises, based on identifying whether each of the one or more neural network models included in the first external device is suitable for the hardware of the electronic device:

transmitting a third signal comprising a request for installation data of one or more neural network models identified as suitable for the hardware of the electronic device to the first external device;

receiving a fourth signal comprising the installation data of the one or more neural network models identified as suitable for the hardware of the electronic device from the first external device, as a response to the third signal; and performing the installation for the one or more neural network models identified as suitable for the hardware of the electronic device based on the installation data.

13. The controlling method as claimed in claim 12, wherein the identifying further comprises:

identifying the one or more neural network models included in the first external device as suitable for the hardware of the electronic device, based on a specification of each of a plurality of hardware configurations included in the electronic device being greater than or equal to specifications of a plurality of hardware configurations included in the first external device, and identifying one or more neural network models having a hardware requirement specification lower than the specifications of the plurality of hardware configurations included in the electronic device among the one or more neural network models included in the first external device as suitable for the hardware of the electronic device, based on specifications of one or more of the plurality of hardware configurations included in the electronic device being less than the specifications of the plurality of hardware configurations included in the first external device.

14. The controlling method as claimed in claim 13, wherein the first device information comprises information on a specification of a processor included in the electronic device, a specification of a-memory included in the electronic device, and a specification of a data acquirer included in the electronic device, wherein the data acquirer included in the electronic device acquires data input to the one or more neural network models included in the electronic device, and includes at least one of a camera, a microphone, or a sensor included in the electronic device, wherein the second device information includes information on a specification of a processor included in the first external device, a specification of a memory included in the first external device, and a specification of a data acquirer included in the first external device, wherein the data acquirer included in the first external device acquires data input to the one or more neural network models included in the first external device, and includes at least one of a camera, a microphone, or a sensor included in the first external device, and wherein the first model information comprises information on a hardware requirement specification of each of the one or more neural network models included in the first external device.

15. The controlling method as claimed in claim 14, wherein the electronic device further stores second model information on the one or more neural network models included in the electronic device and a model suitability identifier for identifying a neural network model suitable for replacing the one or more neural network models included in the electronic device, wherein the controlling method further comprises identifying whether each of the one or more neural network models identified as suitable for the hardware of the electronic device is suitable for replacing the one or more neural network models included in the electronic device by inputting the first model information and the second model information into the model suitability identifier, based on the one or more neural network models suitable for the hardware of the electronic device being identified, wherein the third signal comprises a request for installation data of the one or more neural network models identified as suitable for replacing the one or more neural network models included in the electronic device, and wherein the fourth signal comprises the installation data of the one or more neural network models identified as suitable for replacing the one or more neural network models included in the electronic device.

16. The controlling method as claimed in claim 15, wherein the first model information further comprises information on a service type and information on a personalization level of each of the one or more neural network models included in the first external device, and wherein the second model information further comprises information on a service type and information on a personalization level of each of the one or more neural network models included in the electronic device.

17. The controlling method as claimed in claim 16, wherein the identifying of the one or more neural network models suitable for replacing the one or more neural network models included in the electronic device comprises:

comparing service types of the one or more neural network models included in the electronic device with service types of the one or more neural network models identified as suitable for the hardware of the electronic device, based on the information on the service type included in each of the first model information and the second model information, comparing a personalization level of a first neural network model and a personalization level of a second neural network model based on the information on the personalization level included in each of the first model information and the second model information, based on the service type of the first neural network model among the one or more neural network models identified as suitable for the hardware of the electronic device being the same as the service type of the second neural network model among the one or more neural network models included in the electronic device, and identifying the first neural network model as suitable for replacing the second neural network model, based on the personalization level of the first neural network model being higher than the personalization level of the second neural network model.

18. The controlling method as claimed in claim 17, wherein the personalization level of the first neural network model is identified based on at least one of information on a user's usage history of the first external device for the first neural network model and information on a user's feedback of the first external device for the first neural network model, and wherein the personalization level of the second neural network model is identified based on at least one of information on a user's usage history of the electronic device for the second neural network model and information on a user's feedback of the electronic device for the second neural network model.

19. The controlling method as claimed in claim 13,
  wherein the second signal is received from the first external device through a communicator as user authentication is completed based on first user information on the electronic device and second user information on the first external device,
  wherein the first user information comprises at least one of account information on a user of the electronic device or identification information on the electronic device, and
  wherein the second user information comprises at least one of account information for a user of the first external device or identification information for the first external device.

20. The controlling method as claimed in claim 13, further comprising:
  displaying a user interface comprising information on the one or more neural network models identified as suitable for the hardware of the electronic device; and
  receiving a user input for selecting one or more neural network models among the one or more neural network models identified as suitable for the hardware of the electronic device through the user interface, wherein the third signal comprises a request for installation data of the one or more selected neural network models, and
  wherein the fourth signal comprises a request for installation data of the one or more selected neural network models.

* * * * *